(12) United States Patent
Kung et al.

(10) Patent No.: US 12,004,026 B2
(45) Date of Patent: Jun. 4, 2024

(54) METHOD AND APPARATUS FOR MOBILITY PROCEDURE IN A WIRELESS COMMUNICATION SYSTEM

(71) Applicant: ASUSTek Computer Inc., Taipei (TW)

(72) Inventors: Yi-Hsuan Kung, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 112 days.

(21) Appl. No.: 17/376,435

(22) Filed: Jul. 15, 2021

(65) Prior Publication Data
US 2022/0030480 A1  Jan. 27, 2022

Related U.S. Application Data

(60) Provisional application No. 63/056,143, filed on Jul. 24, 2020, provisional application No. 63/056,179, (Continued)

(51) Int. Cl.
*H04W 36/00* (2009.01)
*H04W 36/08* (2009.01)
(Continued)

(52) U.S. Cl.
CPC ....... *H04W 36/0077* (2013.01); *H04W 36/08* (2013.01); *H04W 72/23* (2023.01)

(58) Field of Classification Search
CPC . H04W 36/0077; H04W 36/08; H04W 72/23; H04W 36/0058; H04W 36/0072; H04W 36/04; H04W 36/0011; H04W 72/21; H04L 5/001; H04L 5/0096; H04L 5/0053
See application file for complete search history.

(56) References Cited

U.S. PATENT DOCUMENTS

2014/0369325 A1\* 12/2014 Bergstrom ........ H04W 56/0005
370/336
2017/0353895 A1  12/2017 Wu
(Continued)

FOREIGN PATENT DOCUMENTS

CN   110677887 A   1/2010
CN   105103613 A   11/2015
(Continued)

OTHER PUBLICATIONS

Corresponding Korean Patent Application No. 10-2021-0092830, Office Action dated Dec. 27, 2022, 8 pages.
(Continued)

*Primary Examiner* — Hoang-Chuong Q Vu
(74) *Attorney, Agent, or Firm* — Cooper Legal Group LLC

(57) ABSTRACT

A method and apparatus are disclosed. In an example from the perspective of a User Equipment (UE), the UE receives, from a first cell, a first signaling indicative of a configuration of a Physical Downlink Control Channel (PDCCH) of a second cell. The UE receives, from the first cell, a second signaling indicative of switching a Special Cell (SpCell) of the UE to the second cell, wherein the second signaling includes a PDCCH signaling and/or a Medium Access Control (MAC) Control Element (CE). The UE monitors the PDCCH of the second cell in response to receiving the second signaling.

20 Claims, 13 Drawing Sheets

Related U.S. Application Data filed on Jul. 24, 2020, provisional application No. 63/056,187, filed on Jul. 24, 2020.

(51) Int. Cl.
*H04W 72/04* (2023.01)
*H04W 72/12* (2023.01)
*H04W 72/23* (2023.01)

(56) References Cited

U.S. PATENT DOCUMENTS

| | | | |
|---|---|---|---|
| 2019/0014512 A1* | 1/2019 | Rune | H04W 36/08 |
| 2019/0313298 A1 | 10/2019 | Rico et al. | |
| 2020/0112886 A1* | 4/2020 | John Wilson | H04W 16/28 |
| 2020/0229057 A1 | 7/2020 | Park et al. | |
| 2020/0260500 A1* | 8/2020 | Agiwal | H04W 74/006 |
| 2021/0068164 A1* | 3/2021 | Sato | H04W 74/0833 |
| 2021/0329512 A1* | 10/2021 | Jassal | H04W 36/0085 |
| 2022/0110159 A1* | 4/2022 | Shi | H04W 72/044 |
| 2022/0201716 A1* | 6/2022 | Yi | H04W 72/0453 |
| 2022/0369179 A1* | 11/2022 | Ren | H04L 5/001 |
| 2023/0007499 A1* | 1/2023 | Da Silva | H04W 24/02 |
| 2023/0072323 A1* | 3/2023 | Matsumura | H04L 5/0053 |
| 2023/0074423 A1* | 3/2023 | Matsumura | H04L 5/0055 |
| 2023/0164828 A1* | 5/2023 | Uesaka | H04W 74/0816 370/329 |
| 2023/0209569 A1* | 6/2023 | Matsumura | H04L 5/0094 370/329 |
| 2023/0262600 A1* | 8/2023 | Wallentin | H04W 36/0088 370/311 |

FOREIGN PATENT DOCUMENTS

| | | |
|---|---|---|
| CN | 110300433 A | 10/2019 |
| EP | 2448325 A1 | 5/2012 |
| KR | 20080086315 A | 9/2008 |
| WO | 2018230997 A1 | 12/2018 |

OTHER PUBLICATIONS

Huawei, et al.: Physical Layer Aspects for NR Mobility Enhancements, 3GPP TSG RAN WGI Meeting #98, R1-1908075, Prague, Czech Republic, Aug. 26-30, 2019, 12 pages.

Samsung: "Acquiring MIB Upon Handorver", 3GPP TSG-RAN2 104, R2-1816305, Spokane, USA, Nov. 12-16, 2018, 3 pages.

ZTE Corporation, et al.: "Discussion on the Need of RACH-less HO in NR", 3GPP TSG RAN WG2 Meeting #107, R2-1910740, Prague, Czech Republic, Aug. 26-30, 2019, 5 pages.

Huawei et al. "Discussion on Conditional PScell Change", 3GPP TSG-RAN WG2 Meeting #108, R2-1915848, Reno, Nevada, USA, Nov. 18-22, 2019, 3 pages.

Corresponding Korean Patent Application No. 10-2021-0092830, Office Action dated Jul. 18, 2023, 12 pages.

Corresponding Chinese Patent Application No. 2021-10801531.0, Office Action dated Dec. 6, 2023, 18 pages.

Huawei: "Introduction of Additional Enhancements for NB-IoT", 3GPP TSG-WG2 Meetng #108, R2-1915299, Reno, Nevada USA Nov. 18-22, 2019, 56 pages.

* cited by examiner

| CORE SET Pool ID | Serving Cell ID | | | | BWP ID | | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

...

| $T_{(N-2)\times8+7}$ | $T_{(N-2)\times8+6}$ | $T_{(N-2)\times8+5}$ | $T_{(N-2)\times8+4}$ | $T_{(N-2)\times8+3}$ | $T_{(N-2)\times8+2}$ | $T_{(N-2)\times8+1}$ | $T_{(N-2)\times8}$ | Oct N |

FIG. 6

| Serving Cell ID | | CORESET ID | Oct 1 |
|---|---|---|---|
| CORESET ID | TCI State ID | | Oct 2 |

FIG. 7

METHOD AND APPARATUS FOR MOBILITY PROCEDURE IN A WIRELESS COMMUNICATION SYSTEM

CROSS-REFERENCE TO RELATED APPLICATIONS

The present application claims the benefit of U.S. Provisional Patent Application Ser. No. 63/056,143 filed on Jul. 24, 2020, the entire disclosure of which is incorporated herein in its entirety by reference. The present application also claims the benefit of U.S. Provisional Patent Application Ser. No. 63/056,179 filed on Jul. 24, 2020, the entire disclosure of which is incorporated herein in its entirety by reference. The present application also claims the benefit of U.S. Provisional Patent Application Ser. No. 63/056,187 filed on Jul. 24, 2020, the entire disclosure of which is incorporated herein in its entirety by reference.

FIELD

This disclosure generally relates to wireless communication networks, and more particularly, to a method and apparatus for mobility procedure in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE receives, from a first cell, a first signaling indicative of a configuration of a Physical Downlink Control Channel (PDCCH) of a second cell. The UE receives, from the first cell, a second signaling indicative of switching a Special Cell (SpCell) of the UE to the second cell, wherein the second signaling comprises a PDCCH signaling and/or a Medium Access Control (MAC) Control Element (CE). The UE monitors the PDCCH of the second cell in response to receiving the second signaling.

BRIEF DESCRIPTION OF THE DRAWINGS

FIG. 6 is a diagram illustrating an exemplary scenario associated with Transmission Configuration Indicator (TCI) states activation/deactivation for UE-specific Physical Downlink Shared Channel (PDSCH) Medium Access Control (MAC) Control Element (CE) according to one exemplary embodiment.

FIG. 7 is a diagram illustrating an exemplary scenario associated with TCI state indication for UE-specific Physical Downlink Control Channel (PDCCH) MAC CE according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: RP-193133 New WID: Further enhancements on MIMO for NR; 3GPP TS 38.300, V16.0.0, NR and NG-RAN Overall Description; 3GPP TS 38.321, V16.0.0, Medium Access Control (MAC) protocol specification; 3GPP TS 38.331, V16.0.0, Radio Resource Control (RRC) protocol specification; 3GPP TS 38.212 V16.2.0. The standards and documents listed above are hereby expressly incorporated by reference in their entirety.

Figure 1:
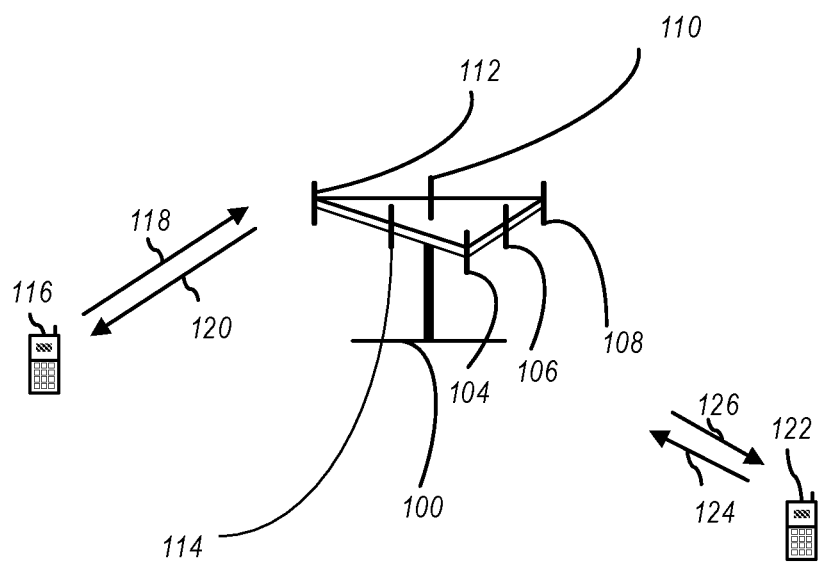
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
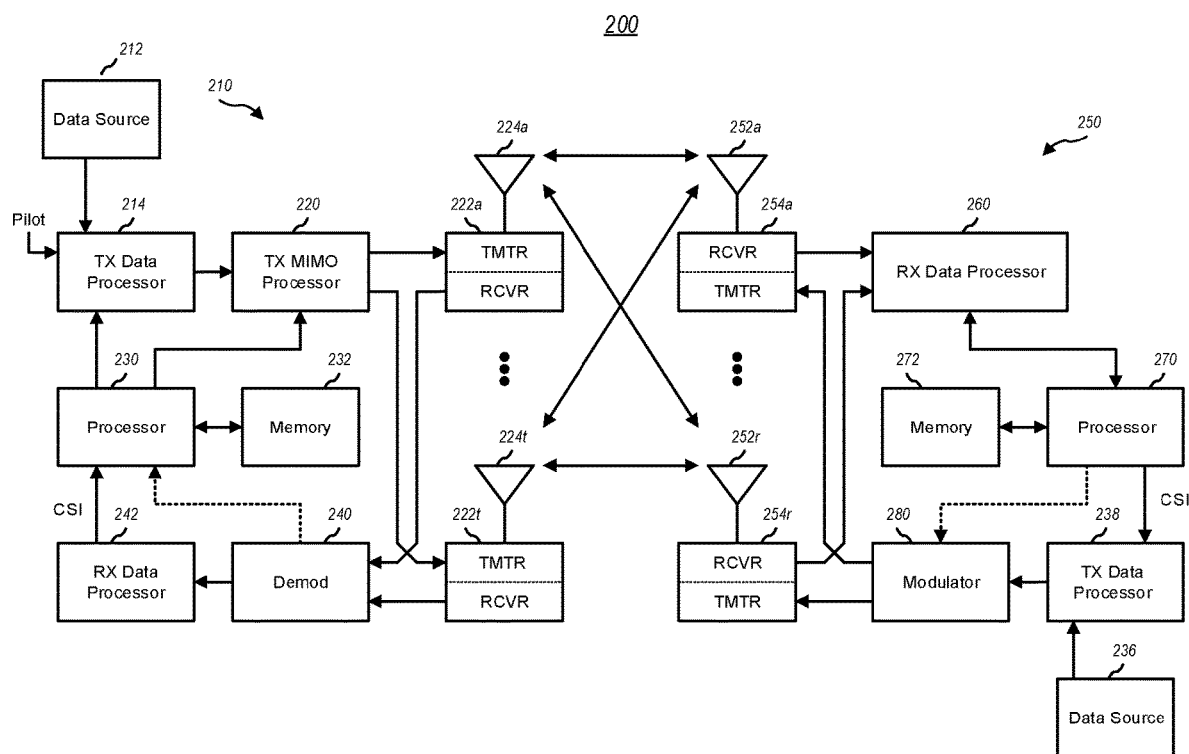
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
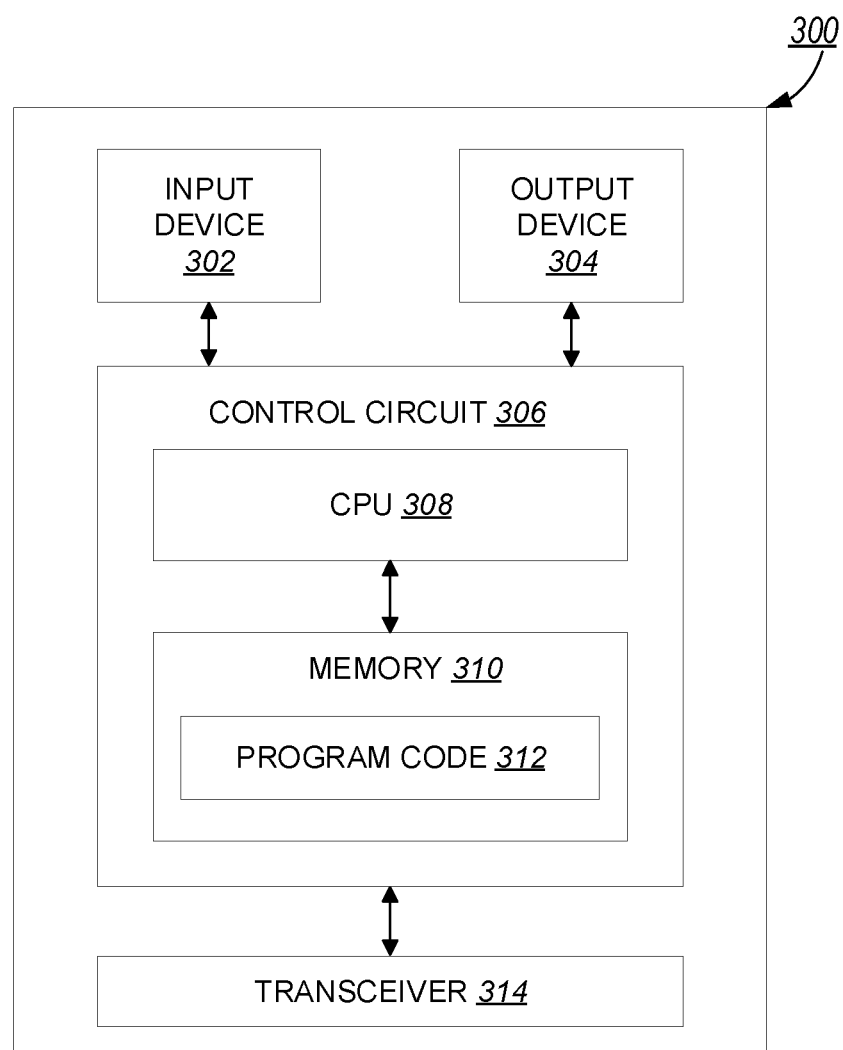
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
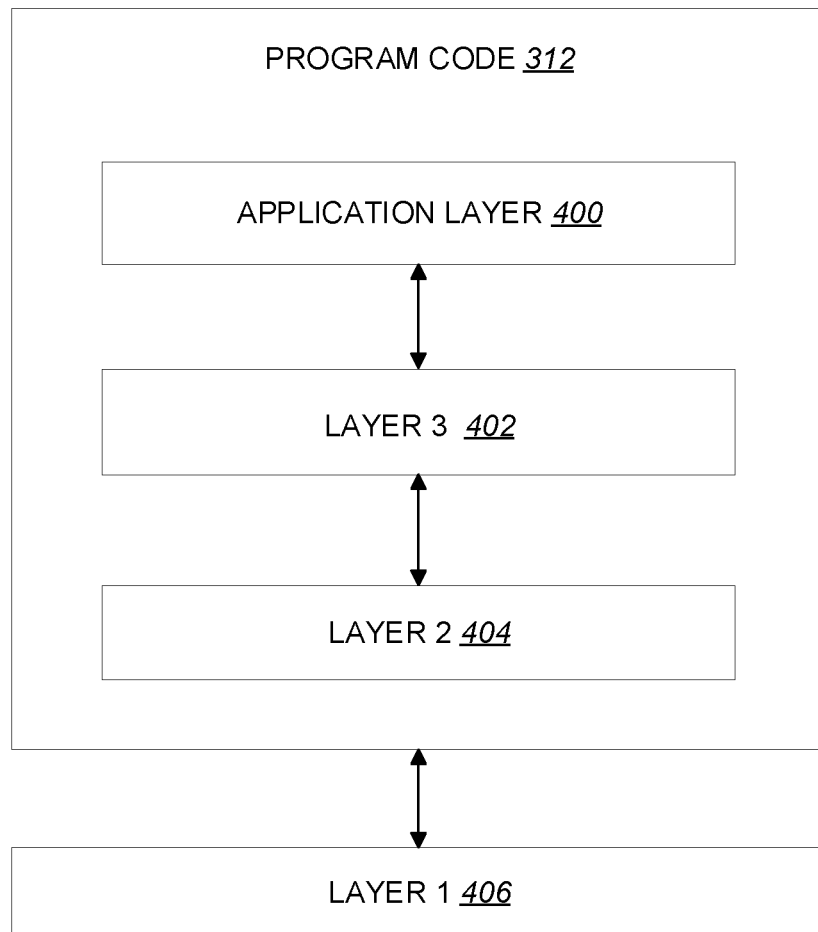
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

In work item description (WID) of further enhancements of multiple-input and multiple-output (MIMO) for NR in RP-193133 New WID, Layer 1 (L1)/Layer 2 (L2)-centric inter-cell mobility may be considered to be an objective. One or more parts of RP-193133 New WID are quoted below:

3 Justification

The Rel-15 NR includes a number of MIMO features that facilitate utilization of a large number of antenna elements at base station for both sub-6 GHz and over-6 GHz frequency bands. The Rel-16 NR enhances Rel-15 by introducing enhanced Type II codebook with DFT-based compression, support for multi-TRP transmission especially for eMBB and PDSCH, enhancements for multi-beam operation including reduction in latency and/or overhead for various reconfigurations (QCL-related, measurements), SCell beam failure recovery (BFR), and L1-SINR. In addition, low PAPR reference signals and features enabling uplink full-power transmission are also introduced.

As NR is in the process of commercialization, various aspects that require further enhancements can be identified from real deployment scenarios. Such aspects include the following. First, while Rel-16 manages to offer some reduction in overhead and/or latency, high-speed vehicular scenarios (e.g. a UE traveling at high speed on highways) at FR2 require more aggressive reduction in latency and overhead—not only for intra-cell, but also for L1/L2 centric inter-cell mobility. This also includes reducing the occurrence of beam failure events. Second, while enhancements for enabling panel-specific UL beam selection was investigated in Rel-16, there was not sufficient time to complete the work. This offers some potential for increasing UL coverage including, e.g. mitigating the UL coverage loss due to meeting the MPE (maximum permissible exposure) regulation. It is noted that MPE issue may occur on all transmit beams from the panel, therefore, a solution for MPE mitigation may only be performed per panel basis to meet the regulatory requirement for scenarios of interest.

Third, channels other than PDSCH can benefit from multi-TRP transmission (as well as multi-panel reception) which also includes multi-TRP for inter-cell operations. This includes some new use cases for multi-TRP such as UL dense deployment within a macro-cell and/or heterogeneous-network-type deployment scenarios. Fourth, due to the use of SRS for various scenarios, SRS can and should be further enhanced at least for capacity and coverage. Fifth, although Rel-16 supports enhanced Type II CSI, some room for further enhancements can be perceived. This includes CSI designed for multi-TRP/panel for NC-JT use case and the utilization of partial reciprocity on channel statistics such as angle(s) and delay(s) mainly targeting FR1 FDD deployments.

4 Objective 4.1 Objective of SI or Core Part WI or Testing Part WI

The work item aims to specify the further enhancements identified for NR MIMO. The detailed objectives are as follows:

Extend specification support in the following areas [RAN1]
1. Enhancement on multi-beam operation, mainly targeting FR2 while also applicable to FR1:
   a. Identify and specify features to facilitate more efficient (lower latency and overhead) DL/UL beam management to support higher intra- and L1/L2-centric inter-cell mobility and/or a larger number of configured TCI states:
      i. Common beam for data and control transmission/reception for DL and UL, especially for intra-band CA
      ii. Unified TCI framework for DL and UL beam indication
      iii. Enhancement on signaling mechanisms for the above features to improve latency and efficiency with more usage of dynamic control signaling (as opposed to RRC)
   b. Identify and specify features to facilitate UL beam selection for UEs equipped with multiple panels, considering UL coverage loss mitigation due to MPE, based on UL beam indication with the unified TCI framework for UL fast panel selection

[ . . . ]

Figure 5:
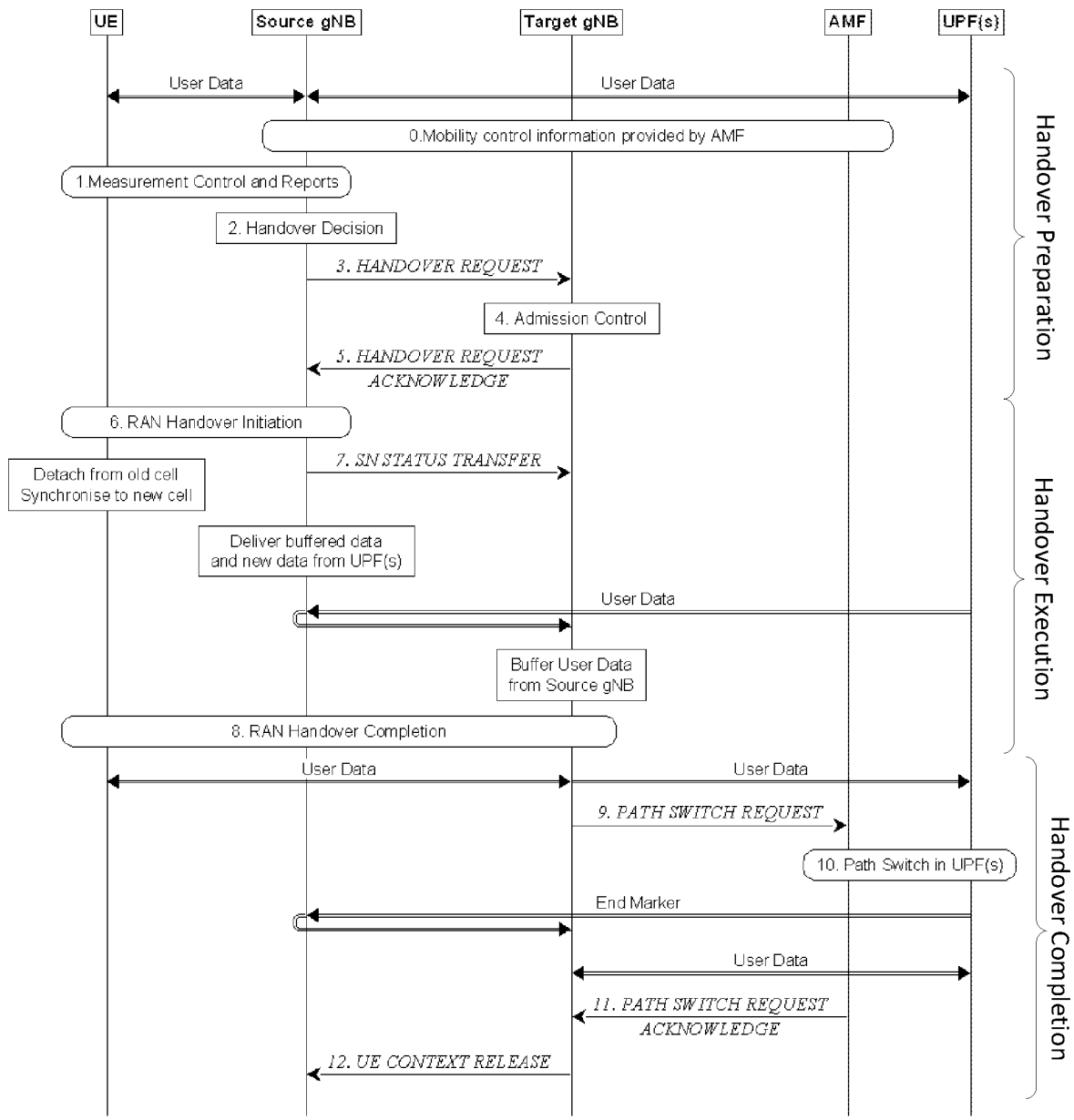
FIG. 5 is a diagram illustrating an exemplary scenario associated with intra-Access and Mobility Management Function (AMF)/User Plane Function (UPF) handover according to one exemplary embodiment.

A description of reconfiguration with sync for NR is introduced in 3GPP TS 38.300, V16.0.0. Notably, FIG. 9.2.3.2.1-1 of Section 9.2.3.2.1 of 3GPP TS 38.300, V16.0.0, entitled "Intra-AMF/UPF Handover", is reproduced herein as FIG. 5. One or more parts of 3GPP TS 38.300, V16.0.0 are quoted below:

9.2.3.2 Handover 9.2.3.2.1 C-Plane Handling

Figure 9:
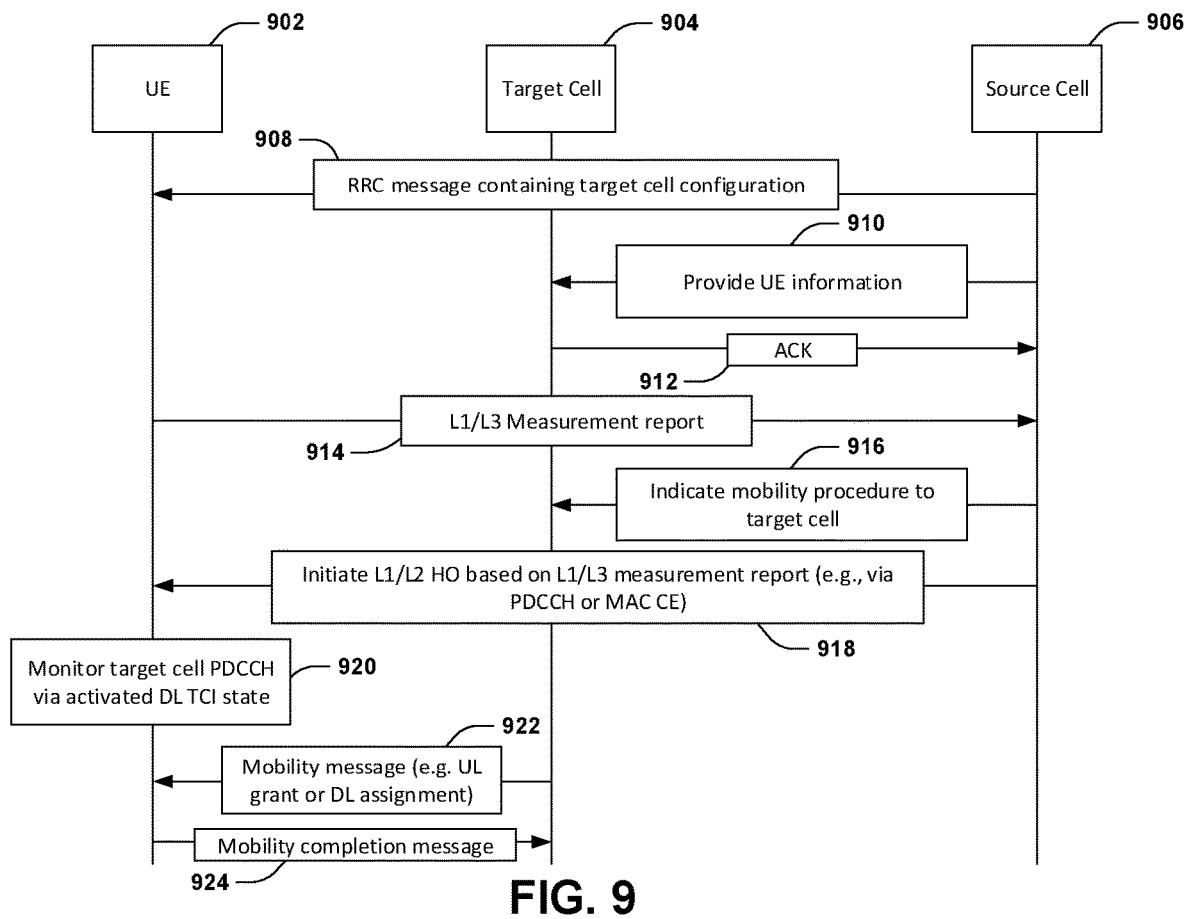
FIG. 9 is a diagram illustrating an exemplary scenario associated with a UE performing a mobility procedure according to one exemplary embodiment.

The intra-NR RAN handover performs the preparation and execution phase of the handover procedure performed without involvement of the 5GC, i.e. preparation messages are directly exchanged between the gNBs. The release of the resources at the source gNB during the handover completion phase is triggered by the target gNB. The figure below depicts the basic handover scenario where neither the AMF nor the UPF changes:

FIG. 9.2.3.2.1-1: Intra-AMF/UPF Handover

0. The UE context within the source gNB contains information regarding roaming and access restrictions which were provided either at connection establishment or at the last TA update.
1. The source gNB configures the UE measurement procedures and the UE reports according to the measurement configuration.
2. The source gNB decides to handover the UE, based on MeasurementReport and RRM information.
3. The source gNB issues a Handover Request message to the target gNB passing a transparent RRC container with necessary information to prepare the handover at the target side. The information includes at least the target cell ID, KgNB*, the C-RNTI of the UE in the source gNB, RRM-configuration including UE inactive time, basic AS-configuration including antenna Info and DL Carrier Frequency, the current QoS flow to DRB mapping rules applied to the UE, the SIB1 from source gNB, the UE capabilities for different RATs, PDU session related information, and can include the UE reported measurement information including beam-related information if available. The PDU session related information includes the slice information and QoS flow level QoS profile(s).

NOTE: After issuing a Handover Request, the source gNB should not reconfigure the UE, including performing Reflective QoS flow to DRB mapping.

4. Admission Control may be performed by the target gNB. Slice-aware admission control shall be performed if the slice information is sent to the target gNB. If the PDU sessions are associated with non-supported slices the target gNB shall reject such PDU Sessions.

5. The target gNB prepares the handover with L1/L2 and sends the HANDOVER REQUEST ACKNOWLEDGE to the source gNB, which includes a transparent container to be sent to the UE as an RRC message to perform the handover.

6. The source gNB triggers the Uu handover by sending an RRCReconfiguration message to the UE, containing the information required to access the target cell: at least the target cell ID, the new C-RNTI, the target gNB security algorithm identifiers for the selected security algorithms. It can also include a set of dedicated RACH resources, the association between RACH resources and SSB(s), the association between RACH resources and UE-specific CSI-RS configuration(s), common RACH resources, and system information of the target cell, etc.

7. The source gNB sends the SN STATUS TRANSFER message to the target gNB.

8. The UE synchronises to the target cell and completes the RRC handover procedure by sending RRCReconfigurationComplete message to target gNB.

9. The target gNB sends a PATH SWITCH REQUEST message to AMF to trigger 5GC to switch the DL data path towards the target gNB and to establish an NG-C interface instance towards the target gNB.

10. 5GC switches the DL data path towards the target gNB. The UPF sends one or more "end marker" packets on the old path to the source gNB per PDU session/tunnel and then can release any U-plane/TNL resources towards the source gNB.

11. The AMF confirms the PATH SWITCH REQUEST message with the PATH SWITCH REQUEST ACKNOWLEDGE message.

12. Upon reception of the PATH SWITCH REQUEST ACKNOWLEDGE message from the AMF, the target gNB sends the UE CONTEXT RELEASE to inform the source gNB about the success of the handover. The source gNB can then release radio and C-plane related resources associated to the UE context. Any ongoing data forwarding may continue.

The RRM configuration can include both beam measurement information (for layer 3 mobility) associated to SSB(s) and CSI-RS(s) for the reported cell(s) if both types of measurements are available. Also, if CA is configured, the RRM configuration can include the list of best cells on each frequency for which measurement information is available. And the RRM measurement information can also include the beam measurement for the listed cells that belong to the target gNB.

The common RACH configuration for beams in the target cell is only associated to the SSB(s). The network can have dedicated RACH configurations associated to the SSB(s) and/or have dedicated RACH configurations associated to CSI-RS(s) within a cell. The target gNB can only include one of the following RACH configurations in the Handover Command to enable the UE to access the target cell:

i) Common RACH configuration;
   ii) Common RACH configuration+Dedicated RACH configuration associated with SSB;
   iii) Common RACH configuration+Dedicated RACH configuration associated with CSI-RS.

The dedicated RACH configuration allocates RACH resource(s) together with a quality threshold to use them. When dedicated RACH resources are provided, they are prioritized by the UE and the UE shall not switch to contention-based RACH resources as long as the quality threshold of those dedicated resources is met. The order to access the dedicated RACH resources is up to UE implementation.

Random access procedure for NR is introduced in 3GPP TS 38.321, V16.0.0, one or more parts of which are quoted below:

5.1 Random Access Procedure
   5.1.1 Random Access Procedure Initialization
   The Random Access procedure described in this clause is initiated by a PDCCH order, by the MAC entity itself, or by RRC for the events in accordance with TS 38.300 [2]. There is only one Random Access procedure ongoing at any point in time in a MAC entity. The Random Access procedure on an SCell shall only be initiated by a PDCCH order with ra-Preambleindex different from 0b000000.

[ . . . ]

When the Random Access procedure is initiated on a Serving Cell, the MAC entity shall:
   1> flush the Msg3 buffer;
   1> set the PREAMBLE_TRANSMISSION COUNTER to 1;
   1> set the PREAMBLE_POWER_RAMPING_ COUNTER to 1;
   1> set the PREAMBLE_BACKOFF to 0 ms;
   1> if the carrier to use for the Random Access procedure is explicitly signalled:
      2> select the signalled carrier for performing Random Access procedure;
      2> set the PCMAX to $P_{CMAX,f,c}$ of the signalled carrier.
   1> else if the carrier to use for the Random Access procedure is not explicitly signalled; and
   1> if the Serving Cell for the Random Access procedure is configured with supplementary uplink as specified in TS 38.331 [5]; and
   1> if the RSRP of the downlink pathloss reference is less than rsrp-ThresholdSSB-SUL:
      2> select the SUL carrier for performing Random Access procedure;
      2> set the PCMAX to $P_{CMAX,f,c}$ of the SUL carrier.
   1> else:
      2> select the NUL carrier for performing Random Access procedure;
      2> set the PCMAX to $P_{CMAX,f,c}$ of the NUL carrier.
   1> perform the BWP operation as specified in clause 5.15;
   1> set PREAMBLE_POWER_RAMPING_STEP to powerRampingStep;
   1> set SCALING_FACTOR_BI to 1;

[ ... ]
1> perform the Random Access Resource selection procedure (see clause 5.1.2).

5.2 Maintenance of Uplink Time Alignment

RRC configures the following parameters for the maintenance of UL time alignment:

timeAlignmentTimer (per TAG) which controls how long the MAC entity considers the Serving Cells belonging to the associated TAG to be uplink time aligned.

The MAC entity shall:
1> when a Timing Advance Command MAC CE is received, and if an $N_{TA}$ (as defined in TS 38.211 [8]) has been maintained with the indicated TAG:
  2> apply the Timing Advance Command for the indicated TAG;
  2> start or restart the timeAlignmentTimer associated with the indicated TAG.
1> when a Timing Advance Command is received in a Random Access Response message for a Serving Cell belonging to a TAG or in a MSGB for an SpCell:
  2> if the Random Access Preamble was not selected by the MAC entity among the contention-based Random Access Preamble:
    3> apply the Timing Advance Command for this TAG;
    3> start or restart the timeAlignmentTimer associated with this TAG.
  2> else if the timeAlignmentTimer associated with this TAG is not running:
    3> apply the Timing Advance Command for this TAG;
    3> start the timeAlignmentTimer associated with this TAG;
    3> when the Contention Resolution is considered not successful as described in clause 5.1.5; or
    3> when the Contention Resolution is considered successful for SI request as described in clause 5.1.5, after transmitting HARQ feedback for MAC PDU including UE Contention Resolution Identity MAC CE:
      4> stop timeAlignmentTimer associated with this TAG.
  2> else:
    3> ignore the received Timing Advance Command
1> when an Absolute Timing Advance Command is received in response to a MSGA transmission including C-RNTI MAC CE as specified in clause 5.1.4a:
  2> apply the Timing Advance Command for PTAG;
  2> start or restart the timeAlignmentTimer associated with PTAG.
1> when a timeAlignmentTimer expires:
  2> if the timeAlignmentTimer is associated with the PTAG:
    3> flush all HARQ buffers for all Serving Cells;
    3> notify RRC to release PUCCH for all Serving Cells, if configured;
    3> notify RRC to release SRS for all Serving Cells, if configured;
    3> clear any configured downlink assignments and configured uplink grants;
    3> clear any PUSCH resource for semi-persistent CSI reporting;
    3> consider all running timeAlignmentTimers as expired;
    3> maintain $N_{TA}$ (defined in TS 38.211 [8]) of all TAGs.
  2> else if the timeAlignmentTimer is associated with an STAG, then for all Serving Cells belonging to this TAG:
    3> flush all HARQ buffers;
    3> notify RRC to release PUCCH, if configured;
    3> notify RRC to release SRS, if configured;
    3> clear any configured downlink assignments and configured uplink grants;
    3> clear any PUSCH resource for semi-persistent CSI reporting;
    3> maintain $N_{TA}$ (defined in TS 38.211 [8]) of this TAG.

When the MAC entity stops uplink transmissions for an SCell due to the fact that the maximum uplink transmission timing difference between TAGs of the MAC entity or the maximum uplink transmission timing difference between TAGs of any MAC entity of the UE is exceeded, the MAC entity considers the timeAlignmentTimer associated with the SCell as expired.

The MAC entity shall not perform any uplink transmission on a Serving Cell except the Random Access Preamble and MSGA transmission when the timeAlignmentTimer associated with the TAG to which this Serving Cell belongs is not running. Furthermore, when the timeAlignmentTimer associated with the PTAG is not running, the MAC entity shall not perform any uplink transmission on any Serving Cell except the Random Access Preamble and MSGA transmission on the SpCell.

Beam related Medium Access Control (MAC) Control Element (CE) for NR is introduced in 3GPP TS 38.321, V16.0.0. Notably, FIG. 6.1.3.14-1 of Section 6.1.3.14 of 3GPP TS 38.321, V16.0.0, entitled "TCI States Activation/Deactivation for UE-specific PDSCH MAC CE", is reproduced herein as FIG. 6. FIG. 6.1.3.15-1 of Section 6.1.3.15 of 3GPP TS 38.321, V16.0.0, entitled "TCI State Indication for UE-specific PDCCH MAC CE", is reproduced herein as FIG. 7. One or more parts of 3GPP TS 38.321, V16.0.0 are quoted below:

5.18.5 Indication of TCI State for UE-Specific PDCCH

The network may indicate a TCI state for PDCCH reception for a CORESET of a Serving Cell or a CC list by sending the TCI State Indication for UE-specific PDCCH MAC CE described in clause 6.1.3.15.

The MAC entity shall:
1> if the MAC entity receives a TCI State Indication for UE-specific PDCCH MAC CE on a Serving Cell:
  2> indicate to lower layers the information regarding the TCI State Indication for UE-specific PDCCH MAC CE.

5.18.12 Activation/Deactivation of Enhanced Spatial Relation of PUCCH Resource

The network may activate and deactivate a spatial relation for a PUCCH resource or a PUCCH resource group of a Serving Cell by sending the Enhanced PUCCH spatial relation Activation/Deactivation MAC CE described in clause 6.1.3.25.

The MAC entity shall:
1> if the MAC entity receives an Enhanced PUCCH spatial relation Activation/Deactivation MAC CE on a Serving Cell:
  2> indicate to lower layers the information regarding the Enhanced PUCCH spatial relation Activation/Deactivation MAC CE.

5.18.13 Indication of Spatial Relation of Aperiodic SRS

The network may indicate the spatial relation info of an aperiodic SRS resource sets of a Serving Cell by sending the AP SRS spatial relation Indication MAC CE described in clause 6.1.3.26.

The MAC entity shall:
1> if the MAC entity receives an AP SRS spatial relation Indication MAC CE on a Serving Cell:
2> indicate to lower layers the information regarding the AP SRS spatial relation Indication MAC CE.

5.18.16 Activation/Deactivation of SRS Resource for CC List

The network may activate and deactivate the configured SRS resource of a CC list by sending the CC list-based SRS Activation/Deactivation MAC CE described in clause 6.1.3.29. The configured SP SRS resource are initially deactivated upon configuration and after a handover.

The MAC entity shall:
1> if the MAC entity receives a CC list-based SRS Activation/Deactivation MAC CE on a Serving Cell:
2> indicate to lower layers the information regarding the CC list-based SRS Activation/Deactivation MAC CE.

6.1.3.14 TCI States Activation/Deactivation for UE-Specific PDSCH MAC CE

The TCI States Activation/Deactivation for UE-specific PDSCH MAC CE is identified by a MAC subheader with LCID as specified in Table 6.2.1-1. It has a variable size consisting of following fields:

Serving Cell ID: This field indicates the identity of the Serving Cell for which the MAC CE applies. The length of the field is 5 bits. If the indicated Serving Cell is configured as part of a CC-list as specified in TS 38.331 [5], this MAC CE applies to all the CCs in the CC list;

BWP ID: This field indicates a DL BWP for which the MAC CE applies as the codepoint of the DCI bandwidth part indicator field as specified in TS 38.212 [9]. The length of the BWP ID field is 2 bits. This field is ignored if this MAC CE applies to a CC list;

$T_i$: If there is a TCI state with TCI-StateId i as specified in TS 38.331 [5], this field indicates the activation/deactivation status of the TCI state with TCI-StateId i, otherwise MAC entity shall ignore the $T_i$ field. The $T_i$ field is set to 1 to indicate that the TCI state with TCI-StateId i shall be activated and mapped to the codepoint of the DCI Transmission Configuration Indication field, as specified in TS 38.214 [7]. The $T_i$ field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with $T_i$ field set to 1, i.e. the first TCI State with $T_i$ field set to 1 shall be mapped to the codepoint value 0, second TCI State with $T_i$ field set to 1 shall be mapped to the codepoint value 1 and so on. The maximum number of activated TCI states is 8;

CORESET Pool ID: This field indicates that mapping between the activated TCI states and the codepoint of the DCI Transmission Configuration Indication set by field $T_i$ is specific to the ControlResourceSetId configured with CORESET Pool ID as specified in TS 38.331 [5]. This field is set to 1 indicates that this MAC CE shall be applied for the DL transmission scheduled by CORESET with the CORESET pool ID equal to 1, otherwise, this MAC CE shall be applied for the DL transmission scheduled by CORESET pool ID equal to 0.

FIG. 6.1.3.14-1: TCI States Activation/Deactivation for UE-Specific PDSCH MAC CE 6.1.3.15 TCI State Indication for UE-Specific PDCCH MAC CE The TCI State Indication for UE-specific PDCCH MAC CE is identified by a MAC subheader with LCID as specified in Table 6.2.1-1. It has a fixed size of 16 bits with following fields:

Serving Cell ID: This field indicates the identity of the Serving Cell for which the MAC CE applies. The length of the field is 5 bits. If the indicated serving cell is configured as part of a CC-list as specified in TS 38.331 [5], this MAC CE applies to all the CCs in the CC list;

CORESET ID: This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;

TCI State ID: This field indicates the TCI state identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

FIG. 6.1.3.15-1: TCI State Indication for UE-Specific PDCCH MAC CE

Procedures involving handover (e.g., at least one of RRC reconfiguration, reconfiguration with sync, etc.) are introduced in 3GPP TS 38.331, V16.0.0, one or more parts of which are quoted below:

3.1 Definitions

Special Cell: For Dual Connectivity operation the term Special Cell refers to the PCell of the MCG or the PSCell of the SCG, otherwise the term Special Cell refers to the PCell.

5.3.5 RRC Reconfiguration 5.3.5.5 Cell Group Configuration 5.3.5.5.1 General

The network configures the UE with Master Cell Group (MCG), and zero or one Secondary Cell Group (SCG). In (NG)EN-DC, the MCG is configured as specified in TS 36.331 [10], and for NE-DC, the SCG is configured as specified in TS 36.331 [10]. The network provides the configuration parameters for a cell group in the CellGroupConfig IE.

The UE performs the following actions based on a received CellGroupConfig IE:
1> if the CellGroupConfig contains the spCellConfig with reconfigurationWithSync:
2> perform Reconfiguration with sync according to 5.3.5.5.2;
2> resume all suspended radio bearers and resume SCG transmission for all radio bearers, if suspended;
1> if the CellGroupConfig contains the rlc-BearerToReleaseList:
2> perform RLC bearer release as specified in 5.3.5.5.3;
1> if the CellGroupConfig contains the rlc-BearerToAddModList:
2> perform the RLC bearer addition/modification as specified in 5.3.5.5.4;
1> if the CellGroupConfig contains the mac-CellGroupConfig:
2> configure the MAC entity of this cell group as specified in 5.3.5.5.5;
1> if the CellGroupConfig contains the sCellToReleaseList:
2> perform SCell release as specified in 5.3.5.5.8;
1> if the CellGroupConfig contains the spCellConfig:
2> configure the SpCell as specified in 5.3.5.5.7;
1> if the CellGroupConfig contains the sCellToAddModList:
2> perform SCell addition/modification as specified in 5.3.5.5.9.

5.3.5.5.2 Reconfiguration with Sync

The UE shall perform the following actions to execute a reconfiguration with sync.
1> if the AS security is not activated, perform the actions upon going to RRC_IDLE as specified in 5.3.11 with the release cause 'other' upon which the procedure ends;
1> stop timer T310 for the corresponding SpCell, if running;
1> start timer T304 for the corresponding SpCell with the timer value set to t304, as included in the reconfigurationWithSync;
1> if the frequencyInfoDL is included:
2> consider the target SpCell to be one on the SSB frequency indicated by the frequencyInfoDL with a physical cell identity indicated by the physCellId;
1> else:
2> consider the target SpCell to be one on the SSB frequency of the source SpCell with a physical cell identity indicated by the physCellId;
1> start synchronising to the DL of the target SpCell;
1> apply the specified BCCH configuration defined in 9.1.1.1;
1> acquire the MIB, which is scheduled as specified in TS 38.213 [13];
NOTE 1: The UE should perform the reconfiguration with sync as soon as possible following the reception of the RRC message triggering the reconfiguration with sync, which could be before confirming successful reception (HARQ and ARQ) of this message.
NOTE 2: The UE may omit reading the MIB if the UE already has the required timing information, or the timing information is not needed for random access.
1> reset the MAC entity of this cell group;
1> consider the SCell(s) of this cell group, if configured, to be in deactivated state;
1> apply the value of the newUE-Identity as the C-RNTI for this cell group;
1> configure lower layers in accordance with the received spCellConfigCommon;
1> configure lower layers in accordance with any additional fields, not covered in the previous, if included in the received reconfigurationWithSync.

CellGroupConfig

The CellGroupConfig IE is used to configure a master cell group (MCG) or secondary cell group (SCG). A cell group comprises of one MAC entity, a set of logical channels with associated RLC entities and of a primary cell (SpCell) and one or more secondary cells (SCells).

CellGroupConfig information element

```
-- Configuration of one Cell-Group:
CellGroupConfig ::=                         SEQUENCE {
  cellGroupId                                 CellGroupId,
  rlc-BearerToAddModList                      SEQUENCE
(SIZE(1..maxLC-ID)) OF RLC-BearerConfig          OPTIONAL,
-- Need N
  rlc-BearerToReleaseList                     SEQUENCE
(SIZE(1..maxLC-ID)) OF LogicalChannelIdentity    OPTIONAL,
-- Need N
  mac-CellGroupConfig                         MAC-CellGroupConfig
OPTIONAL, -- Need M
  physicalCellGroupConfig                     PhysicalCellGroupConfig
OPTIONAL, -- Need M
  spCellConfig                                SpCellConfig
OPTIONAL, -- Need M
  sCellToAddModList                           SEQUENCE (SIZE
(1..maxNrofSCells)) OF SCellConfig               OPTIONAL, --
Need N
  sCellToReleaseList                          SEQUENCE (SIZE
(1..maxNrofSCells)) OF SCellIndex                OPTIONAL, --
Need N
[...]
-- Serving cell specific MAC and PHY parameters for a SpCell:
SpCellConfig ::=                            SEQUENCE {
  servCellIndex                               ServCellIndex
OPTIONAL, -- Cond SCG
  reconfigurationWithSync                     ReconfigurationWithSync
OPTIONAL, -- Cond ReconfWithSync
  rlf-TimersAndConstants                      SetupRelease { RLF-
TimersAndConstants }                             OPTIONAL, -- Need M
  rlmInSyncOutOfSyncThreshold                 ENUMERATED {n1}
OPTIONAL, -- Need S
  spCellConfigDedicated                       ServingCellConfig
OPTIONAL, -- Need M
  ...
}
ReconfigurationWithSync ::=                 SEQUENCE {
  spCellConfigCommon                          ServingCellConfigCommon
OPTIONAL, -- Need M
  newUE-Identity                              RNTI-Value,
  t304                                        ENUMERATED {ms50,
ms100, ms150, ms200, ms500, ms1000, ms2000, ms10000},
  rach-ConfigDedicated                        CHOICE {
    uplink                                      RACH-ConfigDedicated,
    supplementaryUplink                         RACH-ConfigDedicated
  }
OPTIONAL, -- Need N
  ...,
  [[
  smtc                                        SSB-MTC
OPTIONAL -- Need S
  ]]
}
SCellConfig ::=                             SEQUENCE {
  sCellIndex                                  SCellIndex,
  sCellConfigCommon                           ServingCellConfigCommon
OPTIONAL, -- Cond SCellAdd
  sCellConfigDedicated                        ServingCellConfig
OPTIONAL, -- Cond SCellAddMod
  ...,
  [[
  smtc                                        SSB-MTC
OPTIONAL -- Need S
  ]],
```

| CellGroupConfig information element |
| --- |
| [ [<br>sCellState-r16                ENUMERATED {activated}<br>OPTIONAL -- Need SCellAddSync<br>] ] } |

| CellGroupConfig field descriptions |
| --- |
| mac-CellGroupConfig |
| MAC parameters applicable for the entire cell group.<br>ric-BearerToAddModList |
| Configuration of the MAC Logical Channel, the corresponding RLC entitie sand association with radio bearers.<br>sCellState |
| Indicates whether the SCell shall be considered to be in activated state upon SCell configuration.<br>sCellToAddModList |
| List of secondary serving cells (SCells) to be added or modified.<br>sCellToReleaseList |
| List of secondary serving cells (SCells) to be released.<br>spCellConfig |
| Parameters for the SpCell of this cell group (PCell of MCG or PSCell of SCG). |

ServingCellConfigCommon

The IE ServingCellConfigCommon is used to configure cell specific parameters of a UE's serving cell. The IE contains parameters which a UE would typically acquire from SSB, MIB or SIBs when accessing the cell from IDLE. With this IE, the network provides this information in dedicated signalling when configuring a UE with a SCells or with an additional cell group (SCG). It also provides it for SpCells (MCG and SCG) upon reconfiguration with sync.

| ServingCellConfigCommon information element |
| --- |
| ServingCellConfigCommon ::=   SEQUENCE {<br>  physCellId                         PhysCellId<br>    OPTIONAL, -- Cond HOAndServCellAdd,<br>  downlinkConfigCommon        DownlinkConfigCommon<br>    OPTIONAL, -- Cond HOAndServCellAdd<br>  uplinkConfigCommon           UplinkConfigCommon<br>    OPTIONAL, -- Need M<br>  supplementaryUplinkConfig     UplinkConfigCommon<br>    OPTIONAL, -- Need S<br>  n-TimingAdvanceOffset        ENUMERATED { n0,<br>n25600, n39936 }               OPTIONAL, -- Need S<br>  ssb-PositionsInBurst          CHOICE {<br>    shortBitmap                  BIT STRING (SIZE<br>                                         (4)),<br>    mediumBitmap               BIT STRING (SIZE<br>                                         (8)),<br>    longBitmap                   BIT STRING (SIZE<br>                                         (64))<br>  }<br>    OPTIONAL, -- Cond AbsFreqSSB<br>  ssb-periodicityServingCell    ENUMERATED { ms5, ms10,<br>ms20, ms40, ms80, ms160, spare2,    OPTIONAL, -- Need S<br>spare1 }<br>  dmrs-TypeA-Position          ENUMERATED {pos2,<br>                                         pos3},<br>  lte-CRS-ToMatchAround        SetupRelease {<br>RateMatchPatternLTE-CRS }        OPTIONAL, -- Need<br>M<br>  rateMatchPatternToAddModList   SEQUENCE (SIZE<br>(1..maxNrofRateMatchPatterns)) OF RateMatchPattern OPTIONAL, -- Need N<br>  rateMatchPatternToReleaseList  SEQUENCE (SIZE<br>(1..maxNrofRateMatchPatterns)) OF RateMatchPatternId OPTIONAL, -- Need N<br>  ssbSubcarrierSpacing          SubcarrierSpacing<br>    OPTIONAL, -- Cond HOAndServCellWithSSB<br>  tdd-UL-DL-ConfigurationCommon  TDD-UL-DL-ConfigCommon<br>    OPTIONAL, -- Cond TDD<br>  ss-PBCH-BlockPower           INTEGER (−60..50),<br>[...] |

| ServingCellConfigCommon field descriptions |
| --- |
| downlinkConfigCommon |
| The common downlink configuration of the serving cell, including the frequency information configuration and the initial downlink BWP common configuration. The parameters provided herein should match the parameters configured by MIB and SIB1 (if provided) of the serving cell, with the exception of controlResourceSetZero and searchSpaceZero which can be configured in ServingCellConfigCommon even if MIB indicates that they are absent.<br>[...] |
| ssb-PositionsinBurst |
| Indicates the time domain positions of the transmitted SS-blocks in a half frame with SS/PBCH blocks as defined in TS 38.213 [13], clause 4.1. The first/leftmost bit corresponds to SS/PBCH block index 0, the second bit corresponds to SS/PBCH block index 1, and so on. Value 0 in the bitmap indicates that the corresponding SS/PBCH block is not transmitted while value 1 indicates that the corresponding SS/PBCH block is transmitted. The network configures the same pattern in this field as in the corresponding field in ServingCellConfigCommonSIB. For operation with shared spectrum channel access, only mediumBitmap is used. The UE assumes that a bit at position k > ssb-PositionQCL is 0 |
| ssbSubcarrierSpacing |
| Subcarrier spacing of SSB. Only the values 15 kHz or 30 kHz (FR1), and 120 kHz or 240 kHz (FR2) are applicable. |
| supplementaryUplinkConfig |
| The network configures this field only if uplinkConfigCommon is configured. If this field is absent, the UE shall release the supplementaryUplinkConfig and the supplementaryUplink configured in ServingCellConfig of this serving cell, if configured. |

| tdd-UL-DL-ConfigurationCommon |
| --- |
| A cell-specific TDD UL/DL configuration, see TS 38.213 [13], clause 11.1. |

| Conditional Presence | Explanation |
| --- | --- |
| HOAndServCellAdd | This field is mandatory present upon SpCell change and upon serving cell (PSCell/SCell) addition. Otherwise, the field is absent. |
| HOAndServCellWithSSB | This field is mandatory present upon SpCell change and upon serving cell (SCell with SSB or PSCell) addition. Otherwise, the field is absent. |

MAC-CellGroupConfig

The IE MAC-CellGroupConfig is used to configure MAC parameters for a cell group, including DRX.

| MAC-CellGroupConfig information element |
| --- |
| MAC-CellGroupConfig ::=    SEQUENCE {<br>  drx-Config                          SetupRelease { DRX-Config }<br>    OPTIONAL, -- Need M<br>  schedulingRequestConfig    SchedulingRequestConfig<br>    OPTIONAL, -- Need M<br>  bsr-Config                          BSR-Config<br>    OPTIONAL, -- Need M<br>  tag-Config                          TAG-Config<br>    OPTIONAL, -- Need M<br>  phr-Config                          SetupRelease { PHR-Config }<br>    OPTIONAL, -- Need M<br>  skipUplinkTxDynamic        BOOLEAN,<br>  ...,<br>  [ [<br>  csi-Mask                            BOOLEAN<br>    OPTIONAL, -- Need M<br>  dataInactivityTimer            SetupRelease {<br>  DataInactivityTimer }            OPTIONAL -- Cond MCG-<br>    Only<br>  ] ],<br>  [ [<br>  [...] |

RLC-Config

The IE RLC-Config is used to specify the RLC configuration of SRBs and DRBs.

[ . . . ]

PDCP-Config

The IE PDCP-Config is used to set the configurable PDCP parameters for signalling and data radio bearers.

[ . . . ]

In 3GPP TS 38.212 V16.2.0, a Downlink Control Indicator (DCI) format for Physical Downlink Control Channel (PDCCH) order is introduced. One or more parts of 3GPP TS 38.212 V16.2.0 are quoted below:

7.3.1.2 DCI formats for scheduling of PDSCH 7.3.1.2.1 Format 1_0

DCI format 1_0 is used for the scheduling of PDSCH in one DL cell.

The following information is transmitted by means of the DCI format 1_0 with CRC scrambled by C-RNTI or CS-RNTI or MCS-C-RNTI:

Identifier for DCI formats—1 bits
  The value of this bit field is always set to 1, indicating a DL DCI format
Frequency domain resource assignment—$\lceil \log_2(N_{RB}^{DL,BWP}(N_{RB}^{DL,BWP}+1)/2) \rceil$ bits where $N_{RB}^{DL,BWP}$ is given by clause 7.3.1.0
If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:

Random Access Preamble index—6 bits according to ra-PreambleIndex in Clause 5.1.2 of [8, TS38.321]

UL/SUL indicator—1 bit. If the value of the "Random Access Preamble index" is not all zeros and if the UE is configured with supplementary Uplink in Serving-CellConfig in the cell, this field indicates which UL carrier in the cell to transmit the PRACH according to Table 7.3.1.1.1-1; otherwise, this field is reserved SS/PBCH index—6 bits. If the value of the "Random Access Preamble index" is not all zeros, this field indicates the SS/PBCH that shall be used to determine the RACH occasion for the PRACH transmission; otherwise, this field is reserved.

PRACH Mask index—4 bits. If the value of the "Random Access Preamble index" is not all zeros, this field indicates the RACH occasion associated with the SS/PBCH indicated by "SS/PBCH index" for the PRACH transmission, according to Clause 5.1.1 of [8, TS38.321]; otherwise, this field is reserved Reserved bits—12 bits for operation in a cell with shared spectrum channel access; otherwise 10 bits

[ . . . ]

In NR, a UE may perform a handover (HO) procedure to switch from one cell to another cell. The UE may perform the handover procedure in response to a Radio Resource Control (RRC) signaling transmitted by a network. The RRC signaling may comprise cell information of a target cell. The network determines to initiate the handover procedure based on one or more measurement reports of the UE. Switching between cells may take place more frequently when a UE is operating and/or performing communication in a frequency range, such as FR2 (e.g., 24.25 GHz to 52.6 GHz). Based on work item description (WID) of further enhancements of MIMO in RP-193133 New WID, inter-cell mobility considering Layer-1 and/or Layer-2 solution may reduce latency of the handover procedures.

Embodiments are provided herein for performing Layer-1 and/or Layer-2 mobility procedures.

A concept of the present disclosure is that a first cell may transmit first information and second information to a UE. The first information may comprise one or more configurations of one or more cells comprising a second cell. The second information may indicate, to the UE, an identity and/or index associated with the second cell (and/or the second information may be indicative of other information in addition to the identity and/or the index). In some examples, the second information may not comprise and/or indicate the one or more configurations of the one or more cells (and/or the second information may not comprise and/or indicate a configuration of the second cell). The second information may indicate to (e.g., instruct) the UE to initiate a mobility procedure on the second cell. In response to receiving the second information, the UE may perform a mobility procedure on the second cell via one or more resources indicated by the first information and/or the second information. The UE may consider the second cell to be a Special Cell (SpCell), or a target cell (and/or a target SpCell) of the UE based on the second information (and/or in response to receiving the second information). The UE may initiate a mobility procedure in response to receiving the second information. Alternatively and/or additionally, the UE may consider the second cell to be a SpCell of the UE in response to completion of the mobility procedure (initiated in response to receiving the second information, for example). The UE may not consider the second cell to be a SpCell of the UE in response to receiving the first information.

The one or more configurations may comprise a serving cell configuration (e.g., a configuration of a serving cell).

The one or more configurations may comprise a measurement configuration (e.g., a measurement object of a cell).

The one or more configurations may comprise a Medium Access Control (MAC) configuration (e.g., MAC-Cell-GroupConfig), a Radio Link Control (RLC) configuration (e.g., RLC-Config) and/or a Packet Data Convergence Protocol (PDCP) configuration (e.g., PDCP-Config) configuration.

The first information and the second information may be transmitted in different signalings (e.g., the first information may be transmitted via a first signaling and/or the second information may be transmitted via a second signaling). The term "signaling" as used herein may correspond to at least one of a signal, a set of signals, a transmission, a message, etc.

The first information and the second information may be transmitted at different timings (e.g., the first information may be transmitted at a first timing and/or the second information may be transmitted at a second timing). The term "timing" as used herein may correspond to at least one of a time, a slot, a frame, a sub-frame, a time period, etc.

The mobility procedure may comprise the UE generating and/or triggering a mobility completion message (for transmission to the second cell, for example). For example, the UE may generate and/or trigger the mobility completion message (for transmission to the second cell, for example) in response to receiving the second information. The mobility procedure may comprise the UE transmitting the mobility completion message to the second cell. In some examples, the mobility procedure does not comprise the UE initiating a random access procedure to the second cell. In some examples, the mobility procedure may comprise the UE receiving an acknowledgement (e.g., a positive acknowledgement) from the second cell in response to the mobility completion message. For example, the acknowledgement may indicate reception (e.g., successful reception) of the mobility completion message (and/or the acknowledgement may be transmitted (to the UE) in response to reception of the mobility completion message).

Alternatively and/or additionally, the mobility procedure may comprise the first cell activating, for the UE, one or more downlink (DL) Transmission Configuration Indicator (TCI) states and/or one or more uplink (UL) TCI states associated with the second cell.

The mobility procedure may comprise the UE monitoring downlink transmission from the second cell. The UE may monitor the downlink transmission via one or more reference signals and/or one or more TCI states indicated and/or activated by the first cell.

The first cell may indicate and/or activate the one or more reference signals via the second information. For example, the second information may be indicative of the one or more reference signals. Alternatively and/or additionally, the second information may be indicative of activation of the one or more reference signals.

Alternatively and/or additionally, the first cell may indicate and/or activate the one or more reference signals via the first information. For example, the first information may be indicative of the one or more reference signals. Alternatively and/or additionally, the first information may be indicative of activation of the one or more reference signals.

The first cell may indicate and/or activate the one or more downlink TCI states and/or the one or more uplink TCI states via the second information. For example, the second information may be indicative of the one or more downlink TCI states and/or the one or more uplink TCI states. Alternatively and/or additionally, the second information may be indicative of activation of the one or more downlink TCI states and/or the one or more uplink TCI states.

Alternatively and/or additionally, the first cell may indicate and/or activate the one or more downlink TCI states and/or the one or more uplink TCI states via the first information. For example, the first information may be indicative of the one or more downlink TCI states and/or the one or more uplink TCI states. Alternatively and/or additionally, the first information may be indicative of activation of the one or more downlink TCI states and/or the one or more uplink TCI states.

Alternatively and/or additionally, the second information may be (and/or may be transmitted in) a signaling indicative of an activation of one or more TCI states (e.g., the signaling may comprise a TCI and/or Sounding Reference Signal (SRS) activation MAC Control Element (CE)) for one or more channels (e.g., Physical Downlink Control Channel (PDCCH), Physical Uplink Control Channel (PUCCH), Physical Uplink Shared Channel (PUSCH) and/or Physical Downlink Shared Channel (PDSCH)).

The mobility procedure may comprise the UE receiving a first signaling from the second cell. The UE may consider the mobility procedure to be completed in response to receiving the first signaling from the second cell. The first signaling may be a PDCCH signaling addressed to a Radio Network Temporary Identifier (RNTI) value associated with the UE. The first signaling may be a downlink assignment or an uplink grant. The first signaling may be (and/or may comprise) a mobility message (e.g., a MAC CE).

The RNTI value may be provided and/or indicated by the first information and/or the second information. For example, the UE may be provided with the RNTI value via the first information and/or the second information (e.g., the first information and/or the second information may be indicative of the RNTI value).

The mobility procedure may comprise the UE transmitting a second signaling to the second cell. In some examples, the second signaling may be transmitted to the second cell in response to receiving the first signaling from the second cell. Alternatively and/or additionally, the UE may consider the mobility procedure to be completed in response to transmitting the second signaling to the second cell. The second signaling may be a PUCCH transmission and/or a PUSCH transmission. The second signaling may be indicative of an acknowledgement (e.g., a positive acknowledgement) associated with the first signaling (e.g., the acknowledgement may be indicative of successful reception of the first signaling). The second signaling may be (and/or may comprise) a mobility completion message.

The mobility completion message may be a MAC CE.

The mobility completion message may be a RRC message.

The mobility completion message may be a message different from a RRC message.

The mobility completion message may be transmitted via PUSCH and/or PUCCH.

The mobility completion message may comprise a Cell Radio Network Temporary Identifier (C-RNTI) MAC CE.

The mobility completion message may comprise an identity of the UE.

The mobility completion message may be a Channel State Information (CSI) report (e.g., a periodic CSI report or an aperiodic CSI report).

The mobility completion message may be a Scheduling Request (SR).

The UE may trigger a SR in response to receiving the second information.

The UE may trigger an aperiodic CSI report in response to receiving the second information.

The acknowledgement from the second cell (e.g., the acknowledgement transmitted to the UE in response to the mobility completion message) may be a PDCCH indicating an uplink grant and/or a downlink assignment (for the second cell, for example). For example, the uplink grant may be used by the UE for transmitting an uplink transmission to the second cell. Alternatively and/or additionally, the downlink grant may be used by the UE for receiving a downlink transmission from the second cell.

The mobility completion message may be a handover-complete message-like message (HO-complete message-like message). For example, the mobility completion message may be similar to a handover-complete message (HO-complete message) and/or the mobility completion message may comprise information (e.g., at least one of one or more parameters, one or more information elements, etc.) of a handover-complete message (HO-complete message). In some examples, the mobility completion message may not be a RRC message.

In some examples, the UE may monitor a PDCCH via a TCI state associated with the second cell in response to receiving the second information. The UE may receive a mobility message from the second cell after receiving the second information. For example, the UE may receive the mobility message when the UE monitors the PDCCH via the TCI state associated with the second cell (e.g., the mobility message may be received via the PDCCH).

The first cell may indicate to (and/or instruct) the second cell to transmit the mobility message to the UE when and/or if the first cell determines to initiate the mobility procedure on the UE. For example, the first cell may transmit a third signaling to the second cell indicating an identity of the UE to the second cell. The first cell may transmit the second information to the UE before or after the first cell transmits the third signaling to the second cell. In some examples, the third signaling may be indicative of the second cell transmitting the mobility message to the UE (and/or the third signaling may instruct the second cell to transmit the mobility message to the UE).

The first information may be indicative of resource information for performing a mobility procedure on the second cell (e.g., the resource information may comprise all resource information for performing the mobility procedure on the second cell or a portion of resource information for performing the mobility procedure on the second cell). Alternatively and/or additionally, the first information may not be indicative of resource information for performing a mobility procedure on the second cell (e.g., the resource information may comprise all resource information for performing the mobility procedure on the second cell or a portion of resource information for performing the mobility procedure on the second cell). Alternatively and/or additionally, the second information may be indicative of resource information for performing a mobility procedure on the second cell (e.g., the resource information may comprise all resource information for performing the mobility procedure on the second cell or a portion of resource information for performing the mobility procedure on the second cell). Alternatively and/or additionally, the second information may not be indicative of resource information for performing a mobility procedure on the second cell (e.g., the resource information may comprise all resource information for performing the mobility procedure on the second cell or a portion of resource information for performing the mobility procedure on the second cell).

Resource information (indicated by the first information and/or the second information) may be indicative of one or more resources for the UE. The one or more resources indicated by the first information and/or the second information may be (and/or may comprise and/or indicate) one or more uplink grants and/or one or more uplink resources (e.g., one or more PUSCH resources and/or one or more PUCCH resources) for the UE to perform one or more uplink transmissions to the second cell. The one or more resources may be used for transmitting an uplink transmission (e.g., a single uplink transmission). Alternatively and/or additionally, the one or more resources may comprise and/or indicate one or more reference signals and/or one or more beams associated with one or more uplink resources. The UE may perform one or more uplink transmissions to the second cell via one or more uplink resources associated with the one or more reference signals and/or the one or more beams. The one or more uplink transmissions may comprise the mobility completion message. The resource information may be provided by the second cell to the first cell (e.g., the second cell may transmit the resource information to the first cell).

The resource information may comprise timing alignment (TA) information (e.g., uplink TA information) associated with the second cell. For example, the resource information may indicate Timing Advanced information for uplink transmission to the second cell and/or a value (e.g., a TA value and/or a Timing Advanced value) for uplink transmission to the second cell (e.g., the TA information may comprise the Timing Advanced information). The UE may perform one or more uplink transmissions based on the TA information (such as based on the Timing Advanced information and/or based on the value). The TA information may be provided by the second cell to the first cell.

The resource information may comprise and/or be indicative of a periodicity and/or a scheduling timing interval for one or more uplink resources. The UE may transmit a mobility completion message to the second cell using the one or more uplink resources according to the periodicity and/or the scheduling interval.

The resource information may be indicative of a starting frame (and/or starting sub-frame and/or a starting time), for the one or more resources, for the UE. For example, the starting frame (and/or the starting sub-frame and/or the starting time) may correspond to a frame (and/or a subframe and/or a time) at which the one or more resources start and/or begin.

The resource information may be indicative of one or more Hybrid Automatic Repeat Request (HARQ) processes, for performing the mobility procedure, for the UE (e.g., the UE may use the one or more HARQ processes to perform the mobility procedure).

The resource information may be (and/or may comprise and/or indicate) one or more SR configurations, associated with the second cell, for the UE.

For example, the first information may comprise and/or indicate a set of one or more SR configurations associated with the second cell. The second information may comprise and/or indicate a SR configuration (e.g., the second information may indicate the SR configuration via indicating a SR index), of the set of one or more SR configurations (indicated by the first information, for example), to the UE. The UE may trigger a SR based on the SR configuration indicated by the second information. For example, the UE may select the SR configuration, of the set of one or more SR configurations comprised and/or indicated by the first information, based on the SR configuration being indicated by the second information. The UE may trigger a SR based on the selected SR configuration.

Alternatively and/or additionally, the first information may not comprise and/or indicate a SR configuration (e.g., the first information may not comprise and/or indicate any SR configuration). The second information may comprise and/or indicate one or more SR configurations. The UE may trigger a SR according to a SR configuration among the one or more SR configurations (indicated by the second information) in response to receiving the second information.

Alternatively and/or additionally, the second information may not comprise and/or indicate a SR configuration for the UE (e.g., the second information may not comprise and/or indicate any SR configuration for the UE). The UE may trigger a SR in response to reception of the second information. The SR may be associated with (e.g., may be triggered based on) a SR configuration among one or more SR configurations indicated by the first information.

The SR (e.g., the SR triggered by the UE in response to reception of the second information) may be associated with (e.g., may be triggered based on) a SR configuration with a nearest and/or earliest transmission opportunity and/or a nearest and/or earliest uplink resource among the one or more SR configurations. For example, the SR may be triggered according to the SR configuration based on a determination that, among the one or more SR configurations, the SR configuration has the nearest and/or earliest transmission opportunity and/or the nearest and/or earliest uplink resource.

Alternatively and/or additionally, the SR (e.g., the SR triggered by the UE in response to reception of the second information) may be associated with (e.g., may be triggered based on) a SR configuration associated with at least one of a default index, a highest index among the one or more SR configurations, a lowest index of the one or more SR configurations, an index 0, etc. For example, the SR may be triggered according to the SR configuration based on a determination that an index associated with the SR configuration matches the default index. Alternatively and/or additionally, the SR may be triggered according to the SR configuration based on a determination that, among the one or more SR configurations, the SR configuration has the highest index or the lowest index. Alternatively and/or additionally, the SR may be triggered according to the SR configuration based on a determination that an index associated with the SR configuration is index 0.

Alternatively and/or additionally, the SR configuration may be provided by the first cell before the first information (e.g., the first cell may provide the SR configuration associated with the SR to the UE before transmitting the first information to the UE).

The resource information may comprise one or more resources associated with CSI reporting. For example, the UE may transmit, based on resource information (e.g., using the one or more resources associated CSI reporting), one or more periodic CSI reports to the second cell in response to receiving the second information. Alternatively and/or additionally, the UE may transmit one or more semi-persistent CSI reports to the second cell in response to receiving the second information. For example, the UE may transmit the one or more semi-persistent CSI reports to the second cell based on the resource information (e.g., using the one or more resources associated CSI reporting). Alternatively and/or additionally, the UE may transmit one or more aperiodic CSI reports to the second cell in response to receiving the second information.

For example, the UE may transmit the one or more aperiodic CSI reports to the second cell based on the resource information (e.g., using the one or more resources associated CSI reporting). In some examples, the resource information may indicate one or more Channel State Information Reference Signal (CSI-RS) resources associated with one or more CSI reports for the UE The first information and/or the second information may comprise downlink reference signal information and/or uplink reference signal information, associated with the second cell, for the UE (e.g., the UE may use the downlink reference signal information and/or the uplink reference signal information for communication with the second cell).

The first information may comprise TCI state information and/or reference signal information of the second cell. The TCI state information may comprise and/or indicate one or more TCI states associated with the second cell. The UE may not activate the one or more TCI states in response to receiving the first information. The UE may activate the one or more TCI states in response to receiving the second information. In an example in which the second information indicates (and/or instructs) activation of the one or more TCI states associated with the second cell, the UE may activate the second cell (and/or the one or more TCI states associated with the second cell) in response to receiving the second information.

Alternatively and/or additionally, the first information may not comprise TCI state information and/or reference signal information for the second cell. The second information may comprise TCI state information comprising (and/or indicating) TCI state activation information for PDSCH and/or PDCCH for a serving cell (e.g., the second cell). For example, the TCI state information may be indicative of TCI state activation for PDSCH and/or PDCCH for the serving cell. The second information may comprise TCI state information and/or reference signal information for PUSCH and/or PUCCH for the serving cell. Alternatively and/or additionally, the second information may comprise (and/or indicate) activation of one or more PUCCH resources and/or one or more sounding reference signals (SRSs). The UE may activate one or more TCI states indicated by the second information.

For example, the second information may indicate one or more TCI state IDs and/or one or more reference signal indexes associated with downlink reception (e.g., PDSCH reception and/or PDCCH reception) from the second cell for the UE. In response to receiving the second information, the UE may monitor and/or listen to downlink transmission, from the second cell, associated with one or more TCI states indicated by the second information (e.g., the UE may activate the one or more TCI states) and/or associated with one or more reference signals indicated by the second information.

In another example, the first information may indicate a set of reference signals and/or a set of TCI states, associated with downlink reception from the second cell, for the UE. In some examples, the UE does not activate the set of TCI states in response to receiving the first information. The second information may be indicative of a subset of the set of reference signals and/or a subset of the set of TCI states in the first information. The UE may monitors and/or listen to the second cell for downlink reception via one or more channels and/or one or more beams associated with the subset of reference signals and/or the subset of TCI states (e.g., the UE may activate the subset of TCI states in response to receiving the second information). In some examples, the one or more channels and/or the one or more beams are monitored and/or listened to by the UE in response to (and/or after) reception of the second information. In some examples, the one or more channels and/or the one or more beams are monitored and/or listened to by the UE based on a determination that the one or more channels and/or the one or more beams are associated with the subset of reference signals and/or the subset of TCI states indicated by the second information.

The first information and/or the second information may comprise TA information (e.g., uplink TA information) associated with the second cell. For example, the first information and/or the second information may indicate Timing Advanced information for uplink transmission to the second cell and/or a value (e.g., a TA value and/or a Timing Advanced value) for uplink transmission to the second cell (e.g., the TA information may comprise the Timing Advanced information). The UE may perform one or more uplink transmissions based on the TA information (such as based on the Timing Advanced information and/or based on the value). The TA information may be provided by the second cell to the first cell.

The TCI state information may be provided to the first cell by the second cell.

The first information may indicate one or more physical cell identities (e.g., PhysCellId and/or Physical Cell ID (PCI)) associated with the one or more cells (comprising the second cell).

The first information may indicate one or more uplink configurations of the one or more cells and/or one or more downlink configurations of the one or more cells. For example, the one or more downlink configurations may comprise one or more PDSCH configurations and/or one or more PDCCH configurations of the one or more cells. The one or more uplink configurations may comprise one or more PUCCH configurations and/or one or more PUSCH configurations of the one or more cells.

In some examples, the resource information may be provided by the second cell to the first cell before the first cell transmits the first information to the UE. Alternatively and/or additionally, the resource information may be provided by the second cell to the first cell before the first cell transmits the second information to the UE.

In an example, the first information may not indicate one or more resources for the UE to perform a mobility procedure (on the second cell, for example). The second information may indicate one or more resources associated with the second cell for the UE to perform a mobility procedure. In response to receiving the second information, the UE performs the mobility procedure on the second cell using the one or more resources indicated by the second information.

In another example, the second information may not indicate one or more resources for the UE to perform a mobility procedure (on the second cell, for example). The first information may indicate, to the UE, resource information indicating one or more resources, associated with the second cell, for the mobility procedure. In response to receiving the second information, the UE may perform a mobility procedure to the second cell using one or more resources indicated by the first information. In some examples, the one or more resources indicated by the first information are not available (and/or are not activated and/or are suspended) for the UE before reception of the second information (e.g., the one or more resources may become available and/or activated for the UE in response to and/or upon reception of the second information).

In another example, the first information indicates a set of one or more resources associated with the second cell for the UE. The second information indicates, to the UE, a subset of the set of one or more resources associated with the second cell. The UE may perform a mobility procedure (e.g., the UE may perform an uplink transmission to transmit a mobility completion message) using the subset of one or more resources indicated by the second information (e.g., the UE may perform the mobility using the subset of one or more resources after receiving the second information).

In another example, the first information indicates TA information associated with the second cell and/or the second information does not indicate TA information associated with the second cell. In response to receiving the second information, the UE performs uplink transmission transmitting a mobility completion message to the second cell based on the TA information indicated by the first information (e.g., the UE may perform the uplink transmission transmitting the mobility completion message to the second cell by applying the TA information indicated by the first information).

The first information may indicate cell information of one or more cells (comprising the second cell, for example). Alternatively and/or additionally, the second information may not indicate the cell information of the one or more cells. Alternatively and/or additionally, the second information may not indicate second cell information (of the cell information, for example) of the second cell (e.g., the second cell information of the second cell may comprise all cell information of the second cell or a portion of cell information of the second cell). The one or more cells may be (and/or may comprise) one or more candidate cells of one or more mobility procedures for the UE. The cell information (of the one or more cells comprising the second cell) may be indicative of one or more cell configurations of the one or more cells. The cell information may indicate one or more physical cell identities (e.g., PhysCellId and/or PCI) associated with the one or more cells.

The cell information may indicate one or more uplink configurations and/or one or more downlink configurations of the one or more cells. For example, the one or more downlink configurations may comprise one or more PDSCH configurations and/or one or more PDCCH configurations of the one or more cells. The one or more uplink configurations may comprise one or more PUCCH configurations and/or one or more PUSCH configurations of the one or more cells.

The first information may indicate one or more serving cell configurations associated with one or more cells.

The first information may indicate beam information of the one or more cells. For example, for each cell of the one or more cells, the first information may indicate one or more reference signals for the cell.

The first information may indicate C-RNTI for the UE. The C-RNTI may be used (by the UE, for example) for the second cell (e.g., the C-RNTI may be used for communication with the second cell).

The second information may indicate an identity of the second cell. The second cell may be a cell of the one or more cells indicated by the first information. The identity may be a physical cell identity (e.g., PhysCellId and/or PCI) and/or a serving cell index of the second cell.

The second information may indicate reference signal information associated with the second cell. For example, the second information may comprise one or more reference signal indexes (e.g., Synchronization Signal Block (SSB)-Index and/or CSI-RS-Index) associated with the second cell. In some examples, in response to receiving the second information, the UE may activate one or more TCI states and/or one or more beams (e.g., one or more uplink and/or downlink TCI states and/or beams) that are associated with the one or more reference signal indexes.

Alternatively and/or additionally, the second information may not comprise reference signal information associated with the second cell. The first information may indicate reference signal information associated with the second cell. For example, the UE may perform a mobility procedure to the target cell (based on the reference signal information indicated by the first information, for example) in response to receiving the second information (and/or the UE may perform one or more uplink transmissions via a beam associated with the reference signal information indicated by the first information).

Alternatively and/or additionally, the second information may not comprise an uplink configuration and/or a downlink configuration of the second cell.

The second information may comprise a C-RNTI for the UE.

The reference signal information may be associated with a SSB and/or a CSI-RS.

The reference signal information may indicate a SSB-Index and/or a CSI-RS-Index.

The reference signal information may indicate one or more preamble indexes.

The one or more cells may comprise one or more neighboring cells of the UE.

The one or more cells may comprise one or more serving cells of the UE. The one or more cells may be (and/or may comprise) one or more deactivated serving cells of the UE and/or one or more activated serving cells of the UE.

The first information may be transmitted in a RRC message and/or RRC signaling.

The second information may be transmitted in a PDCCH signaling.

The second information may be transmitted in a PDSCH signaling.

The second information may be transmitted in a Downlink Control Indicator (DCI).

In some examples, the second information is not a RRC message and/or a RRC signaling (and/or the second information may not be transmitted in a RRC message and/or a RRC signaling).

In some examples, the second information is not a PDCCH order. For example, the second information may not use (and/or may not have) DCI format 1_0 (such as discussed in 3GPP TS 38.212 V16.2.0). The second information may be (and/or may be comprised in) a DCI with a DCI format different from a PDCCH order (e.g., the DCI format of the DCI may be different from a DCI format of a PDCCH order). For example, when the UE receives a PDCCH order (and/or in response to the UE receiving the PDCCH order) indicating a random access procedure associated with a cell, the UE may perform a random access procedure to the cell and may not consider the cell to be a SpCell. Alternatively and/or additionally, when the UE receives the second information associated with the second cell (and/or in response to the UE receiving the second information associated with the second cell), the UE may perform a mobility procedure (comprising transmitting a mobility completion message to the second cell, for example) and consider the second cell to be a SpCell. The UE may determine whether or not to perform the mobility procedure based on a DCI format of a DCI. For example, the UE may perform the mobility procedure if the DCI (e.g., the second information) has a first DCI format and/or the UE may not perform the mobility procedure if the DCI (e.g., the second information) has a second DCI format (such as DCI format 1_0).

In some examples, the second information may be (and/or may be comprised in) a DCI comprising one or more fields. A field (of the one or more fields, for example) may indicate information associated with a target cell. For example, the information may comprise a physical cell identity (e.g., PhysCellId and/or PCI) of the target cell. Alternatively and/or additionally, the information may comprise a Secondary Cell (SCell) index of the target cell (if the target cell is a SCell, for example).

The second information may be transmitted in a MAC CE. The second information may be (and/or may be comprised in) a one or more MAC CEs indicating activation and/or deactivation of one or more reference signals and/or one or more TCI states of one or more channels (e.g., the one or more channels may comprise at least one of PDCCH, PUCCH, PDSCH, PUSCH, etc.).

The second information may indicate (e.g., explicitly and/or implicitly indicate) that the UE should perform a mobility procedure on a cell (e.g., the second information may instruct the UE perform the mobility procedure on the cell).

For example, the second information may be (and/or may be comprised in) a MAC CE with a format and/or an associated Logical Channel ID (LCID), wherein the format and/or the associated LCID of the MAC CE are different from a format and/or an associated LCID of a MAC CE associated with TCI States Activation/Deactivation (e.g., TCI States Activation/Deactivation for UE-specific PDSCH MAC CE) and/or different from a format and/or an associated LCID of a MAC CE associated with TCI State Indication (e.g., TCI State Indication for UE-specific PDCCH MAC CE).

For example, the second information may comprise an indicator. A UE may determine to perform handover procedure (e.g., a Layer-1 and/or Layer-2 handover procedure) and/or a mobility procedure in response to receiving the second information comprising the indicator. For example, the UE may determine to perform the handover procedure and/or the mobility procedure based on the indicator being set to a value (e.g., a specific value and/or a configured value with which the UE is configured), such as 1, 2, 3, etc. For example, the UE may determine to perform the handover procedure and/or the mobility procedure in response to receiving the second information if the indicator associated with the second information is set to the value. Alternatively and/or additionally, the UE may not perform the handover procedure and/or the mobility procedure in response to receiving a signaling if the received signaling does not comprise the indicator or if the received signaling comprises the indicator and the indicator is not set to the value.

In another example, the second information may indicate an identity of a cell. A UE may determine whether or not to perform a handover procedure (e.g., a Layer-1 and/or Layer-2 handover procedure) and/or a mobility procedure in response to receiving the second information based on one or more attributes of an identified cell (e.g., a cell identified by the second information, such as a cell for which an identity is indicated by the second information). In some examples, the UE may determine (in response to receiving the second information, for example) to perform a handover procedure (e.g., a Layer-1 and/or Layer-2 handover procedure) and/or a mobility procedure on the identified cell if the identified cell is a neighboring cell of the UE. Alternatively and/or additionally, the UE may not perform a handover procedure (e.g., a Layer-1 and/or Layer-2 handover procedure) and/or a mobility procedure on the identified cell if the identified cell is a serving cell (e.g., if the identified cell is an activated serving cell). The UE may perform a handover procedure (e.g., a Layer-1 and/or Layer-2 handover procedure) and/or a mobility procedure on the identified cell in response to receiving the second information if the identified cell is a serving cell (e.g., if the identified cell is a deactivated serving cell). In some examples, the UE may activate a deactivated serving cell if the UE performs (and/or if the UE determines to perform) a mobility procedure on the deactivated serving cell in response to the second information. For example, the UE may determine to perform a mobility procedure on a serving cell in response to receiving the second information. If the serving cell is deactivated, the UE may activate the serving cell (e.g., the UE may activate the serving cell in response to at least one of receiving the second information, determining to perform the mobility procedure on the serving cell, performing the mobility procedure on the serving cell, etc.).

The indicator may be a field in a DCI. The indicator may be a field in a MAC CE.

Figure 8:
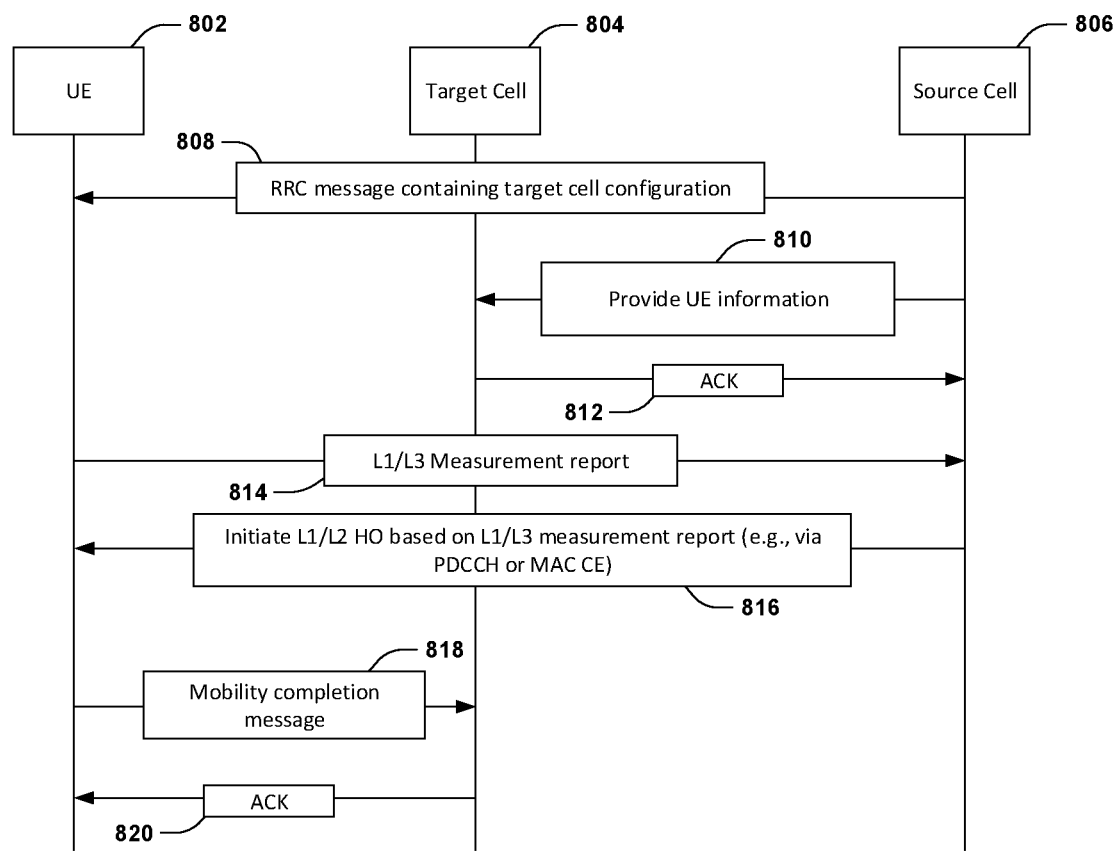
FIG. 8 is a diagram illustrating an exemplary scenario associated with a UE performing a mobility procedure according to one exemplary embodiment.

An example scenario associated with a UE 802 performing a mobility procedure (e.g., a Layer-1 and/or Layer-2 mobility procedure) is shown in FIG. 8, wherein the UE 802 may perform handover via the mobility procedure. The UE 802 performs communication with a Source Cell 806. For example, the UE 802 and/or the Source Cell 806 may establish an RRC connection in RRC_CONNECTED state and/or the UE 802 may perform communication with the Source Cell 806 via the established RRC connection. At 808, the Source Cell 806 transmits a RRC message comprising one or more configurations associated with a Target Cell 804 (and/or comprising one or more other configurations associated with one or more other cells in addition to the one or more configurations associated with the Target Cell 804). The Target Cell 804 may be a neighboring cell of the UE 802. Alternatively and/or additionally, the Target Cell 804 may be (and/or may be configured as) a Serving Cell (e.g., a deactivated Serving Cell) of the UE 802. The RRC message may be a RRCReconfiguration message. Alternatively and/or additionally, the RRC message may comprise one or more measurement configurations of the Target Cell 804. The RRC message may comprise a cell index and/or an identity associated with the Target Cell 804 (e.g., the RRC message may comprise a serving cell index and/or a physical cell identity, such as PhysCellId and/or PCI). The RRC message may comprise a measurement object addition associated with the Target Cell 804. The RRC message may comprise a channel state reporting configuration of the Target Cell 804. The UE 802 may store a configuration of the Target Cell 804 (e.g., at least one of the one or more configurations associated with the Target Cell 804, the one or more measurement configurations, the measurement object addition, the channel state reporting configuration, etc.) and/or may not initiate a handover to the Target Cell 804 in response to the RRC message. Alternatively and/or additionally, the RRC message may comprise one or more uplink resources for the UE 802 to transmit uplink data to the Target Cell 804.

Alternatively and/or additionally, the Source Cell 806 may provide information (e.g., UE information) associated with the UE 802 to the Target Cell 804 (e.g., the information may comprise an identity associated with the UE 802). The Target Cell 804 may transmit an acknowledgement to the Source Cell 806 in response to the information. For example, at 810, the Source Cell 806 may transmit a message, to the Target Cell 804, providing the information of the UE 802 (e.g., the information may comprise a C-RNTI for the UE 802, reference signal information, a measurement report and/or one or more uplink resources) for a mobility procedure (e.g., a possible mobility procedure). At 812, the Target Cell 804 may transmit an acknowledgement to the Source Cell 806. For example, the acknowledgement may comprise one or more resources, dedicated to the UE 802, for mobility procedure (e.g., one or more uplink resources and/or one or more reference signal indexes). Alternatively and/or additionally, the Source Cell 806 may provide at least some of the information (and/or other information associated with the UE 802) to the Target Cell 804 before the RRC message transmission at 808. The Target Cell 804 may transmit the acknowledgement to the Source Cell 806 before the RRC message transmission at 808. The Target Cell 804 may indicate information for the RRC message in the acknowledgement.

Alternatively, the Source Cell 806 may not provide the information (e.g., the UE information) to the Target Cell 804 (and/or the Source Cell 806 may not transmit the message to the Target Cell 804 at 810 and/or the Target Cell 804 may not transmit the acknowledgement to the Source Cell 806 at 812).

The Source Cell 806 may schedule the one or more resources (e.g., one or more resources for mobility procedure to the Target Cell 804) for the UE 802 (without information from the Target Cell 804, for example).

At 814, the UE 802 performs cell measurement and/or beam measurement associated with the Target Cell 804 and performs measurement reporting and/or beam reporting to the Source Cell 806. Alternatively and/or additionally, the UE 802 may perform reporting (e.g., Layer-1 reporting) regarding beam quality of the Target Cell 804 (e.g., CSI reporting). Alternatively and/or additionally, the UE 802 may transmit a measurement report (e.g., a L1/L3 measurement report, such as a Layer-1 and/or Layer-3 measurement report) to the Source Cell 806. The Source Cell 806 may determine, based on one or more measurement reports (e.g., a Layer-1 and/or Layer-3 measurement report and/or a measurement report associated with beam quality of the Target Cell 804) transmitted by the UE 802, whether or not to initiate a mobility procedure for the UE 802 to switch connection to the Target Cell 804. At 816, the Source Cell 806 may trigger and/or initiate a procedure (e.g., a Layer-1 (L1) and/or Layer-2 (L2) handover (HO) procedure and/or a mobility procedure) via transmitting a signaling to the UE

802. For example, the signaling may indicate (and/or instruct) initiation of the procedure. The signaling may be transmitted via PDCCH and/or the signaling may be a DCI. Alternatively and/or additionally, the signaling may be a MAC CE. The signaling may comprise information of the Target Cell 804. The signaling may indicate a cell identity of the Target Cell 804 (e.g., a serving cell index and/or a physical cell identity, such as PhysCellId and/or PCI). In some examples, the information may not comprise a cell configuration (e.g., a cell RRC configuration) of the Target Cell 804. The signaling may indicate and/or provide one or more uplink resources for the UE 802 to perform one or more uplink transmissions to the Target Cell 804. At 818, the UE 802 may perform a mobility procedure on the Target Cell 804 in response to receiving the signaling. Alternatively and/or additionally, the UE 802 transmits a mobility completion message to the Target Cell 804. The mobility completion message may comprise a C-RNTI MAC CE. The C-RNTI may be provided and/or indicated by the Source Cell 806 (e.g., the C-RNTI may be provided and/or indicated by the Source Cell 806 via the RRC message transmission at 808 and/or the signaling transmission at 816). The mobility completion message may comprise information associated with the UE 802 (e.g., the information may comprise a Buffer Status Report (BSR) and/or a SR). The UE 802 may transmit the mobility completion message via the one or more uplink resources (e.g., the one or more uplink resources may be indicated and/or provided to the UE 802 via the RRC message transmission at 808 and/or the signaling transmission at 816). The UE 802 may transmit the mobility completion message before completion of the mobility procedure. For example, the UE 802 may transmit the mobility completion message in multiple uplink resources before completion of the mobility procedure. At 820, the UE may receive an acknowledgement (e.g., a positive acknowledgement) from the Target Cell 804. The UE 802 may consider the mobility procedure to be completed in response to receiving the acknowledgement (e.g., the positive acknowledgement) from the Target Cell 804. In some examples, the acknowledgement may indicate reception (e.g., successful reception) of the mobility completion message by the Target Cell 804. The UE 802 may consider the Target Cell 804 to be a SpCell in response to (and/or upon and/or after) receiving the acknowledgement from the Target Cell 804. Alternatively and/or additionally, the UE 802 may consider the Target Cell 804 to be a SpCell in response to (and/or upon and/or after) completion of the mobility procedure.

An example scenario associated with a UE 902 performing a mobility procedure (e.g., a Layer-1 and/or Layer-2 mobility procedure) is shown in FIG. 9, wherein the UE 902 may perform handover via the mobility procedure. The UE 902 performs communication with a Source Cell 906. For example, the UE 902 and/or the Source Cell 906 may establish an RRC connection in RRC_CONNECTED state and/or the UE 902 may perform communication with the Source Cell 906 via the established RRC connection. At 908, the Source Cell 906 transmits a RRC message comprising one or more configurations associated with a Target Cell 904 (and/or comprising one or more other configurations associated with one or more other cells in addition to the one or more configurations associated with the Target Cell 904). The Target Cell 904 may be a neighboring cell of the UE 902. Alternatively and/or additionally, the Target Cell 904 may be (and/or may be configured as) a Serving Cell (e.g., a deactivated Serving Cell) of the UE 902. The RRC message may be a RRCReconfiguration message. Alternatively and/or additionally, the RRC message may comprise one or more measurement configurations of the Target Cell 904. For example, the RRC message may comprise a measurement object addition associated with the Target Cell 904. The RRC message may comprise a channel state reporting configuration of the Target Cell 904. The RRC message may comprise TCI state information of the Target Cell 904. The UE 902 may store a configuration of the Target Cell 904 (e.g., at least one of the one or more configurations associated with the Target Cell 904, the one or more measurement configurations, the measurement object addition, the channel state reporting configuration, etc.) and/or may not initiate a handover and/or a mobility procedure on the Target Cell 904 in response to the RRC message.

At 910, the Source Cell 906 may transmit a message, to the Target Cell 904, providing information (e.g., UE information) of the UE 902 (e.g., the information may comprise a C-RNTI for the UE 902, reference signal information, a measurement report and/or a TCI state of the UE for the Target Cell 904) for a mobility procedure (e.g., a possible mobility procedure). At 912, the Target Cell 904 may transmit an acknowledgement to the Source Cell 906. For example, the acknowledgement may comprise one or more resources, dedicated to the UE 902, for uplink and/or downlink transmission and/or for Target Cell configuration (e.g., at least one of TCI state information, channel status information, etc.). Alternatively and/or additionally, the Source Cell 906 may transmit the message to the Target Cell 904 before the RRC message transmission at 908. The Target Cell 904 may transmit the acknowledgement to the Source Cell 906 before the RRC message transmission at 908.

Alternatively, the Source Cell 906 may not provide the information (e.g., the UE information) to the Target Cell 904 (and/or the Source Cell 906 may not transmit the message to the Target Cell 904 at 910 and/or the Target Cell 904 may not transmit the acknowledgement to the Source Cell 906 at 912).

At 914, the UE 902 performs cell measurement and/or beam measurement associated with the Target Cell 904 and performs measurement reporting and/or beam reporting to the Source Cell 906. Alternatively and/or additionally, the UE 902 may perform reporting (e.g., Layer-1 reporting) regarding beam quality of the Target Cell 904 (e.g., CSI reporting). Alternatively and/or additionally, the UE 902 may transmit a measurement report (e.g., a L1/L3 measurement report, such as a Layer-1 and/or Layer-3 measurement report) to the Source Cell 906. The Source Cell 906 may determine, based on one or more measurement reports (e.g., a Layer-1 and/or Layer-3 measurement report and/or a measurement report associated with beam quality of the Target Cell 904) transmitted by the UE 902, whether or not to initiate a mobility procedure for the UE 902 to switch connection to the Target Cell 904.

At 916, the Source Cell 906 transmits a second message to the Target Cell 904 indicating a mobility procedure of the UE 902 (e.g., the second message may indicate that the UE 902 is performing and/or will perform a mobility procedure to the Target Cell 904). The Target Cell 904 may trigger and/or generate a mobility message for transmission to the UE 902 in response to the second message.

At 918, the Source Cell 906 may trigger and/or initiate a procedure (e.g., a Layer-1 (L1) and/or Layer-2 (L2) handover (HO) procedure and/or a mobility procedure) via transmitting a signaling to the UE 902. For example, the signaling may indicate (and/or instruct) initiation of the procedure. The signaling may be transmitted via PDCCH and/or the signaling may be a DCI. Alternatively and/or additionally, the signaling may be a MAC CE. The signaling may comprise TCI state activation and/or deactivation information (e.g., uplink and/or downlink TCI state activation and/or deactivation information) of the Target Cell 904. The signaling may comprise information for activation and/or deactivation of the Target Cell 904. The signaling may indicate a cell identity of the Target Cell 904 (e.g., a serving cell index and/or a physical cell identity, such as PhysCellId and/or PCI). In some examples, the information may not comprise a cell configuration (e.g., a cell RRC configuration) of the Target Cell 904.

The UE 902 may activate and/or deactivate one or more TCI states and/or one or more reference signals associated with the Target Cell 904 in response to receiving the signaling (transmitted at 918). The signaling may be (and/or may comprise) a TCI state activation MAC CE for one or more channels. Alternatively and/or additionally, the signaling may comprise an indicator (e.g., a field and/or a bit indication) indicating that the UE 902 may perform (and/or is instructed to perform) mobility procedure on the Target Cell 904 in response to receiving the signaling. At 920, in response to receiving the signaling, the UE 902 may monitor one or more downlink channels (e.g., PDCCH and/or PDSCH) for downlink reception from the Target Cell 904. For example, the UE 902 may monitor the one or more downlink channels (and/or the UE 902 may receive one or more downlink receptions from the Target Cell 904) via one or more TCI states (e.g., one or more activated TCI states, such as one or more activated downlink TCI states) and/or one or more reference signals (e.g., one or more activated reference signals) indicated by the signaling (transmitted at 918) and/or indicated by the RRC message (transmitted at 908).

At 922, the UE 902 may receive a mobility message from the Target Cell 904. In some examples, the mobility message may be received via the downlink channel monitoring (by the UE 902) at 920. The mobility message may comprise an uplink grant and/or a downlink assignment for the UE 902. The mobility message may be transmitted via one or more resources associated with one or more TCI states. For example, the one or more TCI states may be indicated by the Source Cell 906 at 918 (e.g., the signaling transmitted at 918 may be indicative of the one or more TCI states). The mobility message may be a PDCCH transmission addressed to a RNTI value (e.g., C-RNTI) of the UE 902. In an example, the RNTI value may be provided (to the UE 902, for example) by the Source Cell 906 via the signaling (transmitted at 918) and/or via the RRC message (transmitted at 908). At 924, the UE 902 may transmit a mobility completion message to the Target Cell 904 (e.g., the UE 902 may transmit the mobility completion message to the Target Cell 904 in response to receiving the mobility message). The mobility completion message may be (and/or may be transmitted in) a PUCCH transmission and/or a PUSCH transmission. The mobility completion message may be (and/or may comprise and/or indicate) an acknowledgement (e.g., a positive acknowledgement) for the mobility message (e.g., the acknowledgement may indicate reception, such as successful reception, of the mobility message by the UE 902). The UE 902 may consider the mobility procedure to be complete in response to (and/or upon) reception of the mobility message (at 922). Alternatively and/or additionally, the UE 902 may consider the mobility procedure to be complete in response to (and/or upon) transmission of the mobility completion message (at 924).

Figure 10:
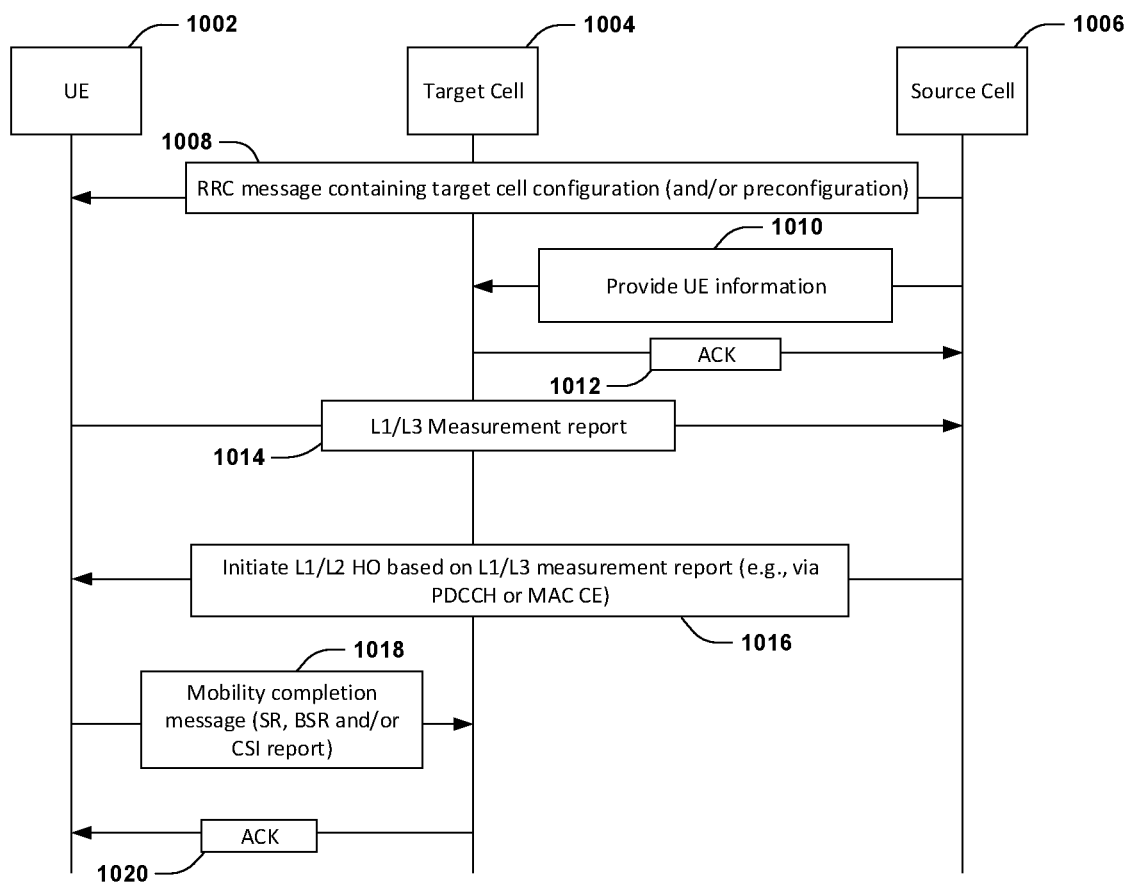
FIG. 10 is a diagram illustrating an exemplary scenario associated with a UE performing a mobility procedure according to one exemplary embodiment.

An example scenario associated with a UE 1002 performing a mobility procedure (e.g., a Layer-1 and/or Layer-2 mobility procedure) is shown in FIG. 10, wherein the UE 1002 may perform handover via the mobility procedure. The UE 1002 performs communication with a Source Cell 1006. For example, the UE 1002 and/or the Source Cell 1006 may establish an RRC connection in RRC_CONNECTED state and/or the UE 1002 may perform communication with the Source Cell 1006 via the established RRC connection. At 1008, the Source Cell 1006 transmits a RRC message comprising one or more configurations (and/or one or more pre-configurations) associated with a Target Cell 1004 (and/or comprising one or more other configurations associated with one or more other cells in addition to the one or more configurations and/or the one or more pre-configurations associated with the Target Cell 1004). The Target Cell 1004 may be a neighboring cell of the UE 1002. Alternatively and/or additionally, the Target Cell 1004 may be (and/or may be configured as) a Serving Cell (e.g., a deactivated Serving Cell) of the UE 1002. The RRC message may be a RRCReconfiguration message. Alternatively and/or additionally, the RRC message may comprise one or more measurement configurations of the Target Cell 1004. The RRC message may comprise a cell index and/or an identity associated with the Target Cell 1004 (e.g., the RRC message may comprise a PCI and/or a serving cell index). The RRC message may comprise a measurement object addition associated with the Target Cell 1004. The RRC message may comprise a channel state reporting configuration of the Target Cell 1004. The RRC message may comprise a SR configuration associated with the Target Cell 1004. The UE 1002 may store a configuration of the Target Cell 1004 (e.g., at least one of the one or more configurations associated with the Target Cell 1004, the one or more measurement configurations, the measurement object addition, the channel state reporting configuration, etc.) and/or may not initiate a handover to the Target Cell 1004 in response to the RRC message. Alternatively and/or additionally, the RRC message may comprise one or more uplink resources for the UE 1002 to transmit uplink data and/or control information to the Target Cell 1004.

Alternatively and/or additionally, the Source Cell 1006 may provide information (e.g., UE information) associated with the UE 1002 to the Target Cell 1004 (e.g., the information may comprise an identity associated with the UE 1002). The Target Cell 1004 may transmit an acknowledgement to the Source Cell 1006 in response to the information. For example, at 1010, the Source Cell 1006 may transmit a message, to the Target Cell 1004, providing the information of the UE 1002 (e.g., the information may comprise a C-RNTI for the UE 1002, reference signal information, a measurement report and/or one or more uplink resources) for a mobility procedure (e.g., a possible mobility procedure). At 1012, the Target Cell 1004 may transmit an acknowledgement to the Source Cell 1006. For example, the acknowledgement may comprise one or more resources, dedicated to the UE 1002, for mobility procedure (e.g., one or more uplink resources and/or one or more reference signal indexes). Alternatively and/or additionally, the Source Cell 1006 may provide at least some of the information (and/or other information associated with the UE 1002) to the Target Cell 1004 before the RRC message transmission at 1008. The Target Cell 1004 may transmit the acknowledgement to the Source Cell 1006 before the RRC message transmission at 1008. The Target Cell 1004 may indicate information for the RRC message in the acknowledgement.

Alternatively, the Source Cell 1006 may not provide the information (e.g., the UE information) to the Target Cell 1004 (and/or the Source Cell 1006 may not transmit the message to the Target Cell 1004 at 1010 and/or the Target Cell 1004 may not transmit the acknowledgement to the Source Cell 1006 at 1012).

The Source Cell 1006 may schedule the one or more resources (e.g., one or more resources for mobility procedure to the Target Cell 1004) for the UE 1002 (without information from the Target Cell 1004, for example).

At 1014, the UE 1002 performs cell measurement and/or beam measurement associated with the Target Cell 1004 and performs measurement reporting and/or beam reporting to the Source Cell 1006. Alternatively and/or additionally, the UE 1002 may perform reporting (e.g., Layer-1 reporting) regarding beam quality of the Target Cell 1004 (e.g., CSI reporting). Alternatively and/or additionally, the UE 1002 may transmit a measurement report (e.g., a L1/L3 measurement report, such as a Layer-1 and/or Layer-3 measurement report) to the Source Cell 1006. The Source Cell 1006 may determine, based on one or more measurement reports (e.g., a Layer-1 and/or Layer-3 measurement report and/or a measurement report associated with beam quality of the Target Cell 1004) transmitted by the UE 1002, whether or not to initiate a mobility procedure for the UE 1002 to switch connection to the Target Cell 1004.

At 1016, the Source Cell 1006 may trigger and/or initiate a procedure (e.g., a Layer-1 (L1) and/or Layer-2 (L2) handover (HO) procedure and/or a mobility procedure) via transmitting a signaling to the UE 1002. For example, the signaling may indicate (and/or instruct) initiation of the procedure. The signaling may be transmitted via PDCCH and/or the signaling may be a DCI. Alternatively and/or additionally, the signaling may be a MAC CE. The signaling may comprise information of the Target Cell 1004. The signaling may indicate a cell identity of the Target Cell 1004 (e.g., a serving cell index and/or a physical cell identity, such as PhysCellId and/or PCI). In some examples, the information may not comprise a cell configuration (e.g., a cell RRC configuration) of the Target Cell 1004. The signaling may indicate and/or provide one or more uplink resources for the UE 1002 to perform one or more uplink transmissions to the Target Cell 1004. At 1018, the UE 1002 may perform a mobility procedure on the Target Cell 1004 in response to receiving the signaling. Alternatively and/or additionally, the UE 1002 transmits a mobility completion message to the Target Cell 1004. The mobility completion message may be (and/or may comprise and/or indicate) a SR. The mobility completion message may be (and/or may comprise and/or indicate) a CSI report (e.g., a periodic CSI report and/or an aperiodic CSI report). The mobility completion message may comprise information associated with the UE 1002 (e.g., the information may comprise a Buffer Status Report (BSR) and/or a SR). The UE 1002 may transmit the mobility completion message via the one or more uplink resources (e.g., the one or more uplink resources may be indicated and/or provided to the UE 1002 via the RRC message transmission at 1008 and/or the signaling transmission at 1016). The UE 1002 may transmit the mobility completion message before completion of the mobility procedure. For example, the UE 1002 may transmit the mobility completion message in multiple uplink resources before completion of the mobility procedure. In some examples, the UE may transmit the SR (e.g., the mobility completion message) at the earliest timing at which an uplink resource for transmission of the SR is available after reception of the signaling (e.g., the UE may transmit the SR using the earliest uplink resource that is available for transmission of the SR after reception of the signaling). Alternatively and/or additionally, the UE may transmit one or more periodic CSI reports and/or one or more aperiodic CSI reports in response to receiving the signaling. The UE may activate a periodic transmission of reporting (e.g., CSI reporting) in response to receiving the signaling. For example, in response to receiving the signaling, the UE may periodically perform reporting (e.g., CSI reporting) to the Target Cell 1004.

At 1020, the UE may receive an acknowledgement (e.g., a positive acknowledgement) from the Target Cell 1004. The UE 1002 may consider the mobility procedure to be completed in response to receiving the acknowledgement (e.g., the positive acknowledgement) from the Target Cell 1004. In some examples, the acknowledgement may indicate reception (e.g., successful reception) of the mobility completion message by the Target Cell 1004. The UE 1002 may consider the Target Cell 1004 to be a SpCell in response to (and/or upon and/or after) receiving the acknowledgement from the Target Cell 1004. Alternatively and/or additionally, the UE 1002 may consider the Target Cell 1004 to be a SpCell in response to (and/or upon and/or after) completion of the mobility procedure (at 1020, for example). In some examples, the acknowledgement (received by the UE 1002 at 1020) may be a PCCH signaling (and/or may be indicative of an uplink grant and/or a downlink assignment).

Figure 11:
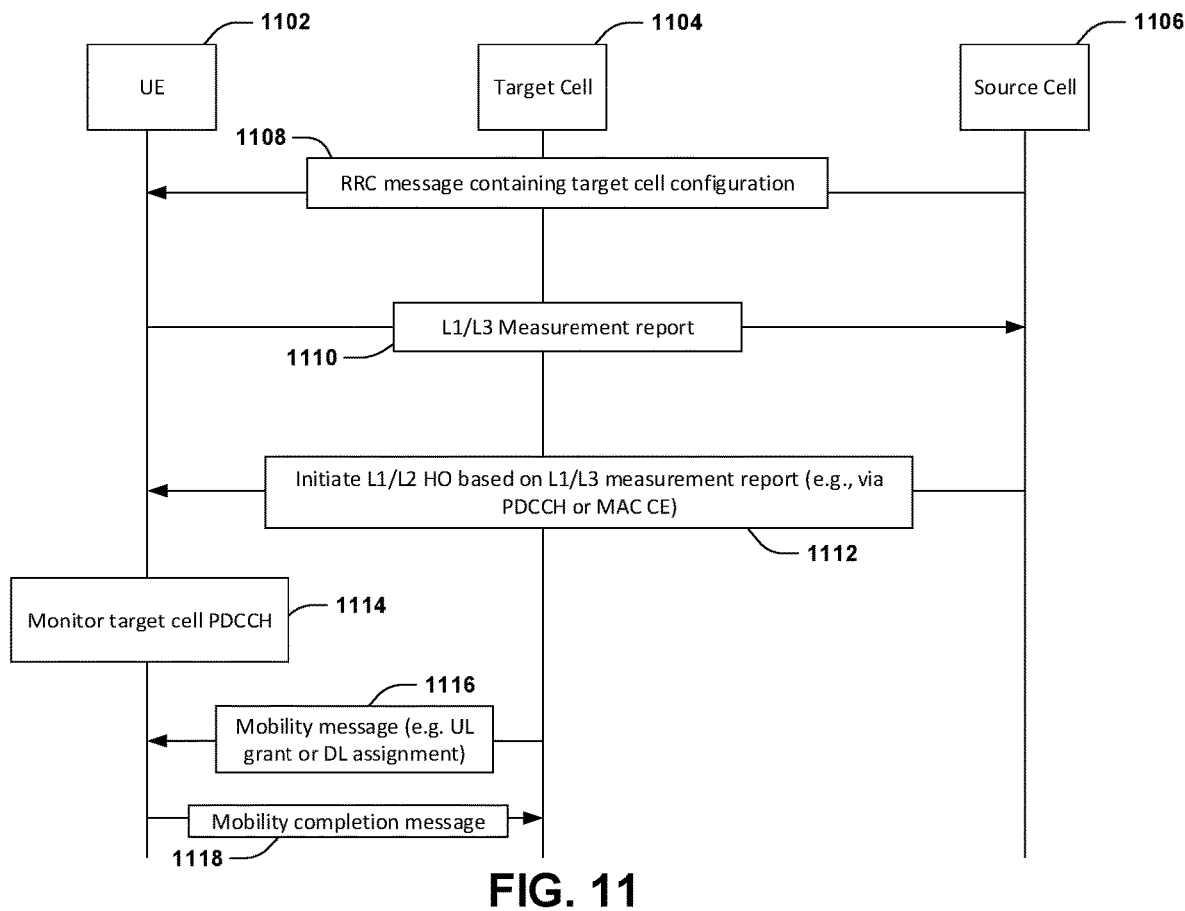
FIG. 11 is a diagram illustrating an exemplary scenario associated with a UE performing a mobility procedure according to one exemplary embodiment.

An example scenario associated with a UE 1102 performing a mobility procedure (e.g., a Layer-1 and/or Layer-2 mobility procedure) is shown in FIG. 11, wherein the UE 1102 may perform handover via the mobility procedure. The UE 1102 performs communication with a Source Cell 1106. For example, the UE 1102 and/or the Source Cell 1106 may establish an RRC connection in RRC_CONNECTED state and/or the UE 1102 may perform communication with the Source Cell 1106 via the established RRC connection. At 1108, the Source Cell 1106 transmits a RRC message comprising one or more configurations associated with a Target Cell 1104 (and/or comprising one or more other configurations associated with one or more other cells in addition to the one or more configurations associated with the Target Cell 1104). The Target Cell 1104 may be a neighboring cell of the UE 1102. Alternatively and/or additionally, the Target Cell 1104 may be (and/or may be configured as) a Serving Cell (e.g., a deactivated Serving Cell) of the UE 1102. The RRC message may be a RRCReconfiguration message. Alternatively and/or additionally, the RRC message may comprise one or more measurement configurations of the Target Cell 1104. For example, the RRC message may comprise a measurement object addition associated with the Target Cell 1104. The RRC message may comprise a channel state reporting configuration of the Target Cell 1104. The RRC message may comprise TCI state information of the Target Cell 1104. The RRC message may indicate a PDCCH configuration of the Target Cell 1104. The UE 1102 may store a configuration of the Target Cell 1104 (e.g., at least one of the one or more configurations associated with the Target Cell 1104, the one or more measurement configurations, the measurement object addition, the channel state reporting configuration, etc.) and/or may not initiate a handover and/or a mobility procedure on the Target Cell 1104 in response to the RRC message.

At 1110, the UE 1102 performs cell measurement and/or beam measurement associated with the Target Cell 1104 and performs measurement reporting and/or beam reporting to the Source Cell 1106. Alternatively and/or additionally, the UE 1102 may perform reporting (e.g., Layer-1 reporting)

regarding beam quality of the Target Cell 1104 (e.g., CSI reporting). Alternatively and/or additionally, the UE 1102 may transmit a measurement report (e.g., a L1/L3 measurement report, such as a Layer-1 and/or Layer-3 measurement report) to the Source Cell 1106. The Source Cell 1106 may determine, based on one or more measurement reports (e.g., a Layer-1 and/or Layer-3 measurement report and/or a measurement report associated with beam quality of the Target Cell 1104) transmitted by the UE 1102, whether or not to initiate a mobility procedure for the UE 1102 to switch connection to the Target Cell 1104.

At 1112, the Source Cell 1106 may trigger and/or initiate a procedure (e.g., a Layer-1 (L1) and/or Layer-2 (L2) handover (HO) procedure and/or a mobility procedure) via transmitting a signaling to the UE 1102. For example, the signaling may indicate (and/or instruct) initiation of the procedure. The signaling may be transmitted via PDCCH and/or the signaling may be a DCI. Alternatively and/or additionally, the signaling may be a MAC CE. The signaling may comprise reference signal information of the Target Cell 1104. The signaling may indicate a cell identity of the Target Cell 1104 (e.g., a serving cell index and/or a physical cell identity, such as PhysCellId and/or PCI). In some examples, the information may not comprise a cell configuration (e.g., a cell RRC configuration) of the Target Cell 1104.

The signaling may comprise an indicator (e.g., a field and/or a bit indication) indicating that the UE 1102 may perform (and/or is instructed to perform) mobility procedure on the Target Cell 1104 in response to receiving the signaling. The signaling may indicate to (and/or instruct) the UE 1102 to switch a connection and/or switch a Primary Cell (PCell) (and/or SpCell) of the UE 1102 to the Target Cell 1104. At 1114, in response to receiving the signaling, the UE 1102 may monitor one or more downlink channels (e.g., PDCCH and/or PDSCH) for downlink reception from the Target Cell 1104.

At 1116, the UE 1102 may receive a mobility message from the Target Cell 1104. In some examples, the mobility message may be received via the downlink channel monitoring (by the UE 1102) at 1114. The mobility message may comprise an uplink grant and/or a downlink assignment for the UE 1102. The mobility message may be transmitted via one or more resources associated with one or more TCI states. For example, the one or more TCI states may be indicated by the Source Cell 1106 at 1112 (e.g., the signaling transmitted at 1112 may be indicative of the one or more TCI states). The mobility message may be a PDCCH transmission addressed to a RNTI value (e.g., C-RNTI) of the UE 1102. In an example, the RNTI value may be provided (to the UE 1102, for example) by the Source Cell 1106 via the signaling (transmitted at 1112) and/or via the RRC message (transmitted at 1108). At 1118, the UE 1102 may transmit a mobility completion message to the Target Cell 1104 (e.g., the UE 1102 may transmit the mobility completion message to the Target Cell 1104 in response to receiving the mobility message). The mobility completion message may be (and/or may be transmitted in) a PUCCH transmission and/or a PUSCH transmission. The mobility completion message may be (and/or may comprise and/or indicate) an acknowledgement (e.g., a positive acknowledgement) for the mobility message (e.g., the acknowledgement may indicate reception, such as successful reception, of the mobility message by the UE 1102). The UE 1102 may consider the mobility procedure to be complete in response to (and/or upon) reception of the mobility message (at 1116). Alternatively and/or additionally, the UE 1102 may consider the mobility procedure to be complete in response to (and/or upon) transmission of the mobility completion message (at 1118).

With respect to one or more embodiments herein, such as one or more techniques, devices, concepts, methods and/or alternatives described above, the handover procedure (e.g., the Layer-1 and/or Layer-2 handover procedure) may be a mobility procedure. The handover procedure may not be a reconfiguration with sync procedure. The mobility procedure may be a procedure for L1/L2-centric inter-cell mobility (e.g., Layer-1-centric inter-cell mobility and/or Layer-2-centric inter-cell mobility).

With respect to one or more embodiments herein, the mobility procedure may comprise a handover procedure (and/or a part of a handover procedure) and/or a reconfiguration with sync procedure (and/or a part of a reconfiguration with sync procedure).

With respect to one or more embodiments herein, the mobility completion message may not comprise (and/or may not be transmitted in) a RRC message.

With respect to one or more embodiments herein, the first cell may be a serving cell.

With respect to one or more embodiments herein, the first cell may be a PCell of the UE.

With respect to one or more embodiments herein, the first cell may be a SCell of the UE.

With respect to one or more embodiments herein, the first cell and the second cell may be in different cell groups (CGs).

With respect to one or more embodiments herein, the first cell may be a source cell of the UE during a mobility procedure.

With respect to one or more embodiments herein, the second cell may be a neighboring cell.

With respect to one or more embodiments herein, the second cell may be a serving cell. Alternatively and/or additionally, the second cell may be a deactivated cell or an activated cell.

With respect to one or more embodiments herein, the UE may activate the second cell in response to receiving the second information.

With respect to one or more embodiments herein, the UE may consider the second cell to be a target cell in response to receiving the second information indicating the second cell.

With respect to one or more embodiments herein, the mobility procedure may comprise the UE transmitting uplink data and/or control information to the target cell. The uplink data may comprise information associated with the UE (e.g., C-RNTI MAC CE). The uplink data may be transmitted via PUSCH. The control information (e.g., uplink control information) may be transmitted via PUCCH.

With respect to one or more embodiments herein, the one or more resources (e.g., one or more uplink resources) may be (and/or may comprise) one or more PUSCH resources and/or one or more PUCCH resources.

With respect to one or more embodiments herein, the first information and the second information may be transmitted in dedicated signalings (e.g., the first information may be transmitted via a first dedicated signaling that is directed and/or transmitted only to the UE and/or the second information may be transmitted via a second dedicated signaling that is directed and/or transmitted only to the UE).

One, some and/or all of the foregoing techniques and/or embodiments can be formed to a new embodiment.

In some examples, embodiments disclosed herein may be implemented independently and/or separately. Alternatively and/or additionally, a combination of embodiments described herein may be implemented. Alternatively and/or additionally, a combination of embodiments described herein may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

Figure 12:
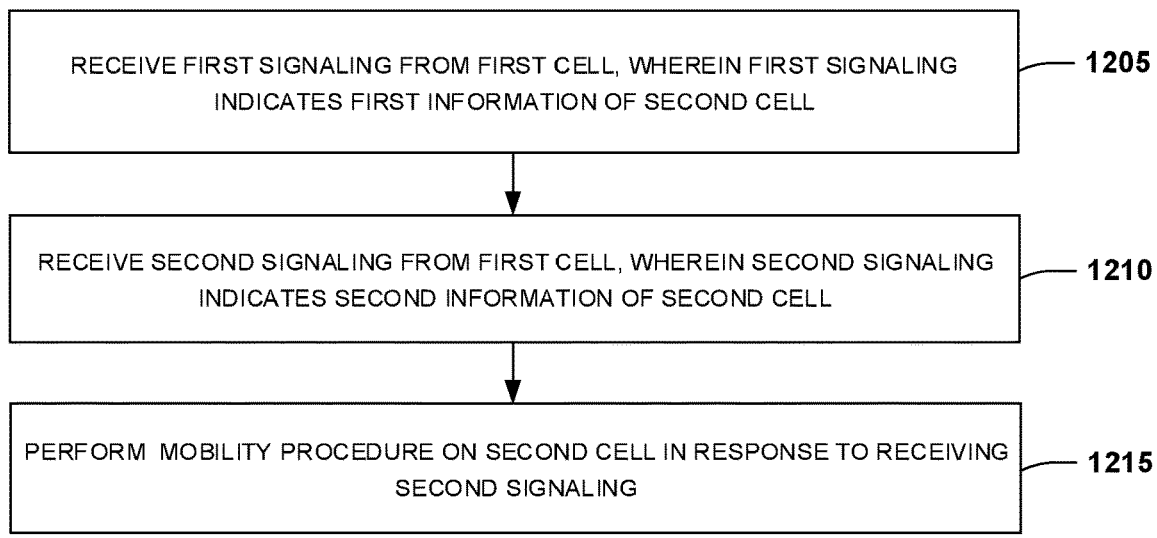
FIG. 12 is a flow chart according to one exemplary embodiment.

FIG. 12 is a flow chart 1200 according to one exemplary embodiment from the perspective of a UE. In step 1205, the UE receives a first signaling from a first cell, wherein the first signaling indicates first information of a second cell. In step 1210, the UE receives a second signaling from the first cell, wherein the second signaling indicates second information of the second cell. In step 1215, the UE performs a mobility procedure on the second cell in response to receiving the second signaling.

Referring back to FIGS. 3 and 4, in one exemplary embodiment of a UE, the device 300 includes a program code 312 stored in the memory 310. The CPU 308 may execute program code 312 to enable the UE (i) to receive a first signaling from a first cell, wherein the first signaling indicates first information of a second cell, (ii) to receive a second signaling from the first cell, wherein the second signaling indicates second information of the second cell, and (iii) to perform a mobility procedure on the second cell in response to receiving the second signaling. Furthermore, the CPU 308 can execute the program code 312 to perform one, some and/or all of the above-described actions and steps and/or others described herein.

Figure 13:
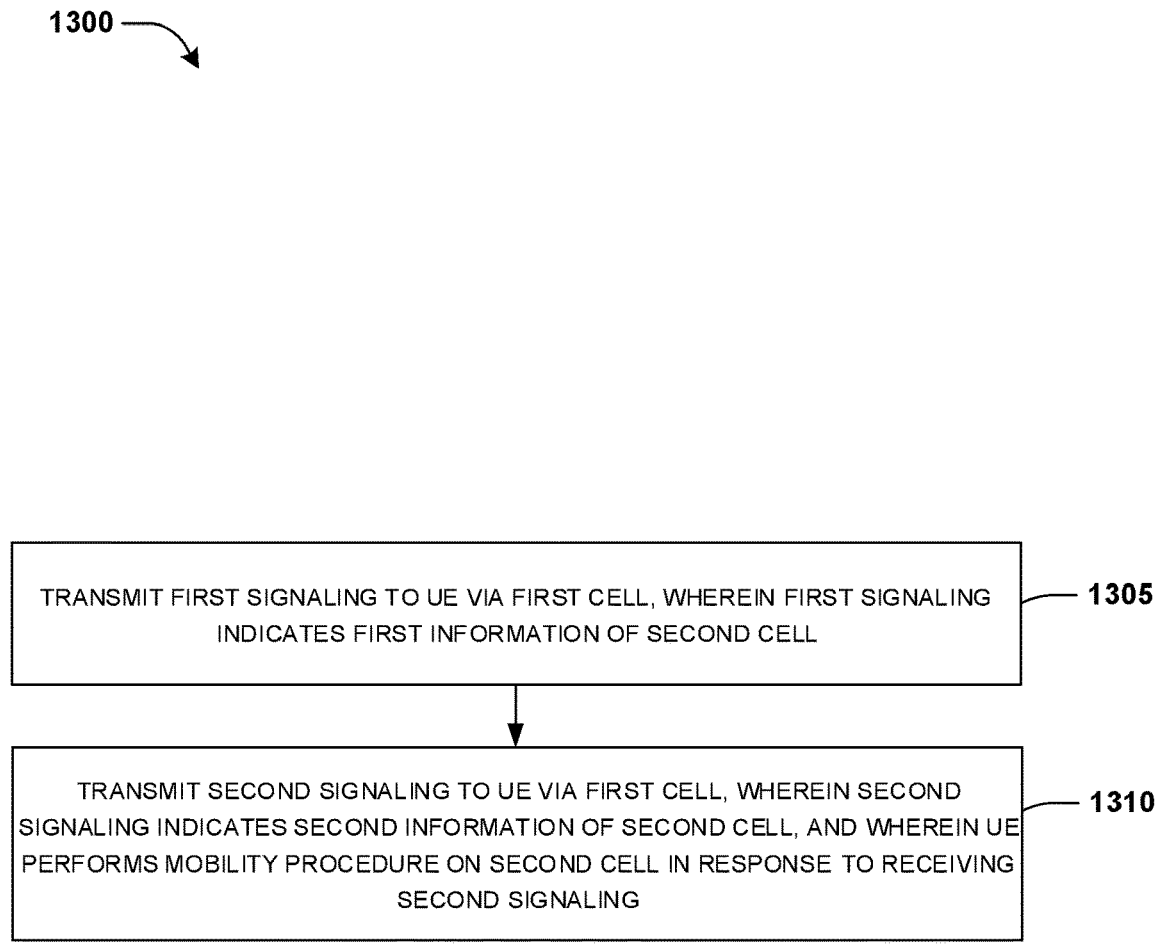
FIG. 13 is a flow chart according to one exemplary embodiment.

FIG. 13 is a flow chart 1300 according to one exemplary embodiment from the perspective of a network. In step 1305, the network transmits a first signaling to a UE via a first cell, wherein the first signaling indicates first information of a second cell. In step 1310, the network transmits a second signaling to the UE via the first cell, wherein the second signaling indicates second information of the second cell, and wherein the UE performs a mobility procedure on the second cell in response to receiving the second signaling.

Referring back to FIGS. 3 and 4, in one exemplary embodiment of a network, the device 300 includes a program code 312 stored in the memory 310. The CPU 308 may execute program code 312 to enable the network (i) to transmit a first signaling to a UE via a first cell, wherein the first signaling indicates first information of a second cell, and (ii) to transmit a second signaling to the UE via the first cell, wherein the second signaling indicates second information of the second cell, and wherein the UE performs a mobility procedure on the second cell in response to receiving the second signaling. Furthermore, the CPU 308 can execute the program code 312 to perform one, some and/or all of the above-described actions and steps and/or others described herein.

With respect to FIGS. 12-13, in one embodiment, the network initiates and/or triggers the mobility procedure of the UE via transmitting the second signaling.

In one embodiment, the UE does not perform a mobility procedure on the second cell in response to receiving the first signaling.

In one embodiment, the mobility procedure comprises the UE performing one or more uplink transmissions transmitting a third signaling to the second cell via one or more uplink resources indicated by the first information and/or the second information. For example, the one or more uplink transmissions may be performed using the one or more uplink resources and/or the one or more uplink transmissions may comprise transmitting the third signaling to the second cell.

In one embodiment, the mobility procedure comprises the UE triggering and/or generating the third signaling (e.g., the UE may trigger and/or generate the third signaling for transmission to the second cell).

In one embodiment, the mobility procedure comprises the UE considering the second cell to be a SpCell (e.g., a SpCell of the UE, such as a PCell of the UE or a Primary Secondary Cell (PSCell) of the UE).

In one embodiment, the UE considers the second cell to be a PCell in response to completion of the mobility procedure and/or in response to reception of an acknowledgement (e.g., a positive acknowledgement), associated with the third signaling, from the second cell (e.g., the acknowledgement may be indicative of reception, such as successful reception, of the third signaling).

In one embodiment, the UE considers the mobility procedure to be complete upon (and/or in response to) reception of an acknowledgement (e.g., a positive acknowledgement), associated with the third signaling, from the second cell (e.g., the acknowledgement may be indicative of reception, such as successful reception, of the third signaling).

In one embodiment, the acknowledgement from the second cell is a PDCCH signaling.

In one embodiment, the first signaling is a RRC message.

In one embodiment, the first signaling indicates an identity of the second cell (e.g., the first signaling may be indicative of a serving cell index of the second cell and/or a physical cell identity of the second cell).

In one embodiment, the first signaling comprises one or more uplink configurations of the second cell.

In one embodiment, the first signaling comprises one or more downlink configurations of the second cell.

In one embodiment, the first signaling comprises beam information (e.g., uplink beam information and/or downlink beam information) of the second cell.

In one embodiment, the first signaling comprises one or more cell configurations of the second cell.

In one embodiment, the first signaling comprises one or more uplink resources, of the second cell, for the UE.

In one embodiment, the second signaling is a DCI.

In one embodiment, the second signaling is not a RRC message.

In one embodiment, the second signaling is a MAC CE.

In one embodiment, the second signaling indicates an identity and/or an index of the second cell.

In one embodiment, the second signaling indicates one or more uplink resources for one or more transmissions to the second cell.

In one embodiment, the second signaling comprises a field. The UE may perform the mobility procedure on a cell (e.g., the second cell) indicated by the second signaling if the field is set to a value (e.g., a specific value and/or a configured value with which the UE is configured).

In one embodiment, the second signaling comprises a field. The UE may not perform the mobility procedure on a cell (e.g., the second cell) indicated by the second signaling if the field is not set to a value (e.g., a specific value and/or a configured value with which the UE is configured).

In one embodiment, the UE transmits a reporting (e.g., one or more reports) to the first cell, wherein the reporting indicates channel quality associated with the second cell.

In one embodiment, the reporting is (and/or comprises) a cell measurement report.

In one embodiment, the reporting is (and/or comprises) a beam reporting (e.g., the reporting comprises CSI).

In one embodiment, the network (and/or the first cell) determines whether or not to initiate the mobility procedure for the UE (and/or whether or not to transmit the second signaling to initiate the mobility procedure) based on the reporting from the UE (and/or based on other information in addition to the reporting from the UE).

In one embodiment, the one or more uplink resources are (and/or comprise) one or more PUCCH resources and/or one or more PUSCH resources.

In one embodiment, the one or more uplink resources comprise timing advanced information for one or more uplink transmissions to the second cell.

In one embodiment, the one or more uplink resources indicate a starting frame (and/or a starting sub-frame) for one or more uplink transmissions to the second cell.

In one embodiment, the second cell is a neighboring cell of the UE.

In one embodiment, the second cell is a serving cell of the UE.

In one embodiment, the second cell is an activated serving cell of the UE.

In one embodiment, the second cell is a deactivated serving cell of the UE.

In one embodiment, the third signaling is a PUCCH transmission and/or a PUSCH transmission.

In one embodiment, the third signaling indicates an RNTI value of the UE, wherein the RNTI value is provided by the first cell via the first information and/or via the second information (e.g., the first information and/or the second information may be indicative of the RNTI value).

In one embodiment, the third signaling is a MAC PDU comprising a MAC CE (and/or comprising other information in addition to the MAC CE).

In one embodiment, the mobility procedure comprises the UE activating one or more TCI states in response to the second signaling (e.g., in response to receiving the second signaling).

In one embodiment, the first information indicates a set of TCI states associated with the second cell, wherein the one or more TCI states (activated by the UE in response to the second signaling, for example) is a subset of the set of TCI states.

In one embodiment, the second information indicates a set of TCI states associated with the second cell, wherein the one or more TCI states (activated by the UE in response to the second signaling, for example) is a subset of the set of TCI states.

In one embodiment, the mobility procedure comprises the UE monitoring the second cell for one or more downlink signalings in response to the second signaling (e.g., in response to receiving the second signaling). For example, in response to the second signaling, the UE may monitor the second cell to detect and/or receive the one or more downlink signalings from the second cell. For example, in response to the second signaling, the UE may monitor the second cell via one or more TCI states activated in response to the second signaling (e.g., one or more TCI states activated by the UE in response to receiving the second signaling).

In one embodiment, the UE monitors the second cell via one or more TCI states activated in response to the second signaling.

In one embodiment, the mobility procedure comprises the UE receiving a downlink signaling from the second cell.

In one embodiment, the downlink signaling is a PDCCH addressed to a RNTI value of the UE, wherein the RNTI value is provided by the first signaling and/or the second signaling. For example, the first information and/or the second information may be indicative of the RNTI value.

In one embodiment, the downlink signaling is (and/or comprises) an uplink grant and/or a downlink assignment of the UE. For example, the UE may use the uplink grant to perform one or more uplink transmissions (to the second cell, for example) and/or the UE may receiving one or more downlink transmissions (from the second cell, for example) based on the downlink assignment.

In one embodiment, the downlink signaling is a PDSCH transmission to the UE.

In one embodiment, the mobility procedure comprises the UE transmitting an uplink signaling to the second cell in response to reception of the downlink signaling.

In one embodiment, the uplink signaling is a PUCCH transmission.

In one embodiment, the uplink signaling is an acknowledgement (e.g., a positive acknowledgement) in response to the downlink signaling. For example, the uplink signaling may indicate reception (e.g., successful reception) of the downlink signaling by the UE.

In one embodiment, the uplink signaling comprises a MAC CE indicating a RNTI value of the UE.

In one embodiment, the first signaling comprises TCI state information of the second cell for the UE. For example, the TCI state information may comprise and/or indicate one or more TCI states associated with the second cell.

In one embodiment, the second signaling indicates activation of one or more TCI states (e.g., one or more downlink TCI states and/or one or more uplink TCI states) and/or one or more reference signals (e.g., one or more downlink reference signals and/or one or more uplink reference signals) for receptions (by the UE, for example) from the second cell and/or transmissions to the second cell.

In one embodiment, the UE starts (and/or restarts) a timer in response to receiving the second signaling, wherein the UE considers the mobility procedure to be failed upon (and/or in response to) expiration of the timer (e.g., timer expiry). For example, the mobility procedure may be considered to be a failed mobility procedure if (and/or when) the timer expires.

In one embodiment, the UE stops the timer in response to receiving the downlink signaling.

In one embodiment, the third signaling is a SR.

In one embodiment, the third signaling is a CSI report.

Figure 14:
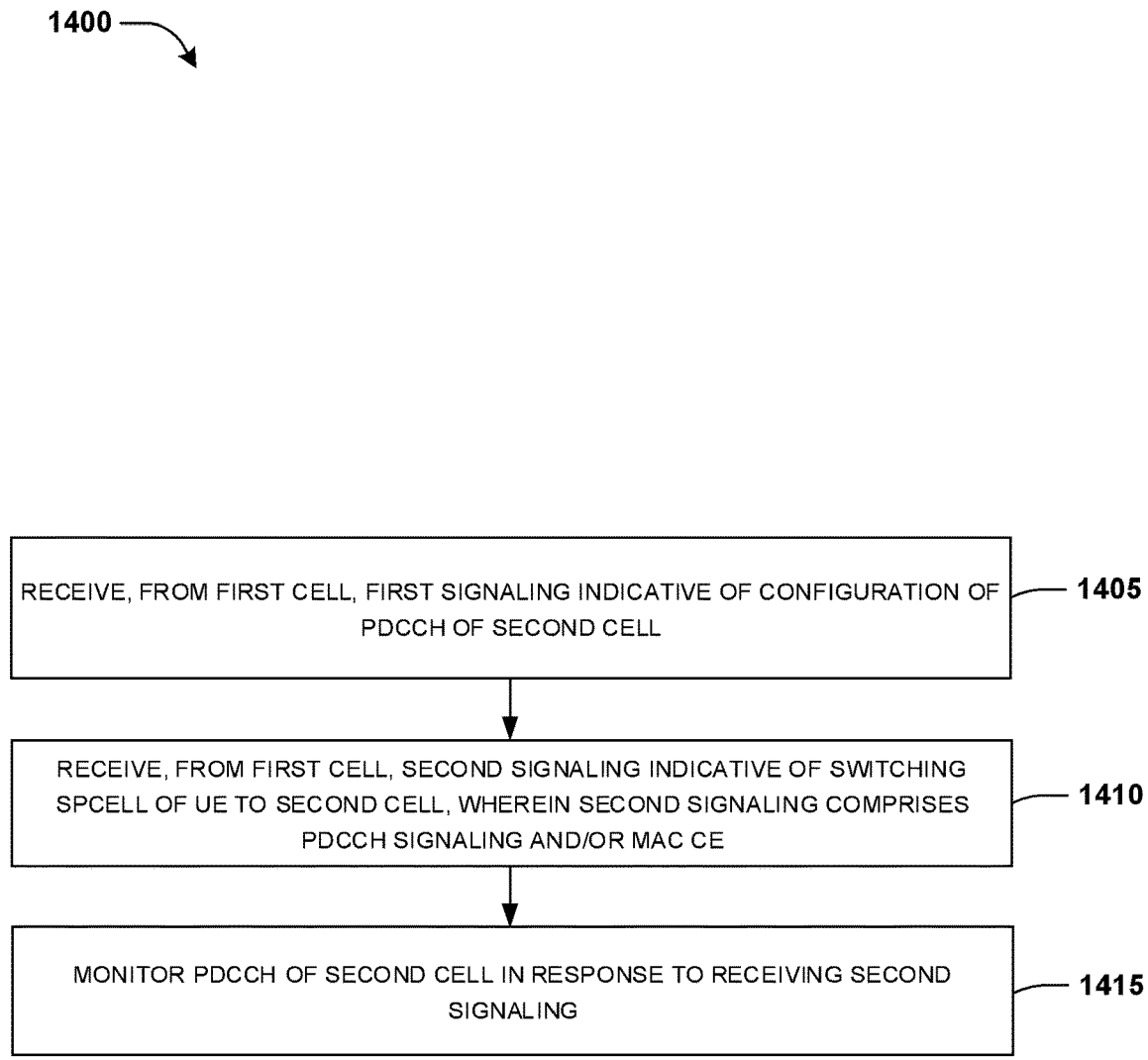
FIG. 14 is a flow chart according to one exemplary embodiment.

FIG. 14 is a flow chart 1400 according to one exemplary embodiment from the perspective of a UE. In step 1405, the UE receives, from a first cell, a first signaling indicative of a configuration of a PDCCH of a second cell (and/or indicative of other information in addition to the configuration of the PDCCH of the second cell). In step 1410, the UE receives, from the first cell, a second signaling indicative of switching a SpCell of the UE to the second cell, wherein the second signaling comprises (and/or is) a PDCCH signaling (e.g., a signaling transmitted via a second PDCCH) and/or a MAC CE. In an example, the second signaling may be transmitted to the UE to switch the SpCell of the UE to the second cell. Alternatively and/or additionally, the second signaling may indicate to (and/or instruct) the UE to switch the SpCell of the UE to the second cell. In step 1415, the UE monitors the PDCCH of the second cell in response to receiving the second signaling.

In one embodiment, the first signaling comprises (and/or is) a RRC message.

In one embodiment, the first signaling is indicative of a cell configuration of the second cell, an identity associated with the second cell, an index associated with the second cell, a C-RNTI for the UE and for the second cell, one or more uplink resources associated with the second cell, TA information associated with the second cell and/or a SR configuration associated with the second cell. For example, the identity may comprise a cell identity (e.g., a physical cell identity, such as PhysCellId and/or PCI) of the second cell. Alternatively and/or additionally, the index may comprise a cell index (e.g., a serving cell index) of the second cell. Alternatively and/or additionally, the C-RNTI may be used by the UE to communicate with the second cell. Alternatively and/or additionally, the one or more uplink resources may be used by the UE to perform one or more uplink transmissions to the second cell (and/or the UE may perform the one or more uplink transmissions based on the TA information).

In one embodiment, the UE triggers a SR associated with the SR configuration in response to receiving the second signaling (e.g., the UE may trigger the SR based on the SR configuration).

In one embodiment, the second signaling is indicative of an identity associated with the second cell, an index associated with the second cell, a C-RNTI for the UE and for the second cell, one or more TCI states of the second cell, TA information associated with the second cell and/or one or more uplink resources associated with the second cell. The one or more TCI states are for the PDCCH, a PUCCH (of the second cell, for example), a PUSCH (of the second cell, for example) and/or a PDSCH (of the second cell, for example). The identity may comprise a cell identity (e.g., a physical cell identity, such as PhysCellId and/or PCI) of the second cell. Alternatively and/or additionally, the index may comprise a cell index (e.g., a serving cell index) of the second cell. Alternatively and/or additionally, the C-RNTI may be used by the UE to communicate with the second cell. Alternatively and/or additionally, the one or more uplink resources may be used by the UE to perform one or more uplink transmissions to the second cell (and/or the UE may perform the one or more uplink transmissions based on the TA information).

In one embodiment, the UE activates the one or more TCI states in response to receiving the second signaling.

In one embodiment, the UE receives a third signaling via the PDCCH, wherein the third signaling comprises a downlink assignment and/or an uplink grant. For example, the UE may receive the third signaling via monitoring the PDCCH (e.g., monitoring the PDCCH in response to receiving the second signaling). The UE generates a mobility completion message in response to receiving the third signaling via the PDCCH.

In one embodiment, the UE generates a mobility completion message in response to receiving the second signaling. The UE transmits the mobility completion message via one or more uplink resources indicated by the first signaling and/or the second signaling.

In one embodiment, the UE considers the second cell to be the SpCell in response to receiving the second signaling or in response to transmitting a mobility completion message. For example, the UE may switch the SpCell of the UE (from a cell different from the second cell) to the second cell in response to receiving the second signaling or in response to transmitting the mobility completion message.

In one embodiment, the second cell is a neighboring cell of the UE before the SpCell of the UE is switched to the second cell. Alternatively and/or additionally, the second cell may be a neighboring cell of the UE when (and/or before and/or after) the UE receives the first signaling. Alternatively and/or additionally, the second cell may be a neighboring cell of the UE when (and/or before and/or after) the UE receives the second signaling. Alternatively and/or additionally, the second cell may remain a neighboring cell of the UE until the SpCell of the UE is switched to the second cell.

In one embodiment, the SpCell is a PCell or a PSCell.

Referring back to FIGS. 3 and 4, in one exemplary embodiment of a UE, the device 300 includes a program code 312 stored in the memory 310. The CPU 308 may execute program code 312 to enable the UE (i) to receive, from a first cell, a first signaling indicative of a configuration of a PDCCH of a second cell (and/or indicative of other information in addition to the configuration of the PDCCH of the second cell), (ii) to receive, from the first cell, a second signaling indicative of switching a SpCell of the UE to the second cell, wherein the second signaling comprises (and/or is) a PDCCH signaling (e.g., a signaling transmitted via a second PDCCH) and/or a MAC CE, and (iii) to monitor the PDCCH of the second cell in response to receiving the second signaling. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 12-14. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 12-14, and/or one, some and/or all of the above-described actions and steps and/or others described herein.

It may be appreciated that applying one or more of the techniques presented herein may result in one or more benefits including, but not limited to, increased efficiency and/or increased speed of communication between devices (e.g., a UE and/or a network node). The increased efficiency and/or increased speed may be a result of enabling the UE to handle Layer-1 and/or Layer-2 (L1/L2) mobility procedures using one or more of the techniques provided herein (e.g., using one or more of the configurations and/or one or more of the procedures provided herein). Alternatively and/or or additionally, the increased efficiency and/or increased speed may be due to reducing latency for performing handover via Layer-1 and/or Layer-2 (L1/L2) mobility procedure.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), the method comprising:
receiving, from a first cell, a first signaling indicative of a configuration of a Physical Downlink Control Channel (PDCCH) of a second cell and a set of Transmission Configuration Indicator (TCI) states of the second cell;
receiving, from the first cell, a Medium Access Control (MAC) Control Element (CE) indicative of (i) switching a Special Cell (SpCell) of the UE to the second cell, (ii) one or more TCI states of the set of TCI states indicated by the first signaling and (iii) timing advance (TA) information associated with the second cell to which the MAC CE is indicative switching the SpCell of the UE; and monitoring the PDCCH of the second cell, via the one or more TCI states indicated by the MAC CE and based on the configuration of the PDCCH indicated by the first signaling, in response to receiving the MAC CE indicative of switching the SpCell of the UE to the second cell.

2. The method of claim 1, comprising:
triggering or generating a Channel State Information (CSI) report for transmission to the second cell in response to receiving the MAC CE.

3. The method of claim 1, wherein:
the first signaling is indicative of at least one of a cell configuration of the second cell, an identity associated with the second cell, an index associated with the second cell, a Cell Radio Network Temporary Identifier (C-RNTI) for the UE and for the second cell, one or more uplink resources associated with the second cell, or a Scheduling Request (SR) configuration associated with the second cell.

4. The method of claim 3, comprising:
triggering a SR associated with the SR configuration in response to receiving the MAC CE.

5. The method of claim 1, wherein:
the MAC CE is indicative of at least one of an identity associated with the second cell, an index associated with the second cell, a Cell Radio Network Temporary Identifier (C-RNTI) for the UE and for the second cell, or one or more uplink resources associated with the second cell.

6. The method of claim 1, comprising:
activating the one or more TCI states in response to receiving the MAC CE.

7. The method of claim 1, comprising:
generating a Radio Resource Control (RRC) message for transmission to the second cell in response to receiving the MAC CE.

8. The method of claim 7, comprising:
transmitting the RRC message via one or more uplink resources indicated by at least one of the first signaling or the MAC CE.

9. The method of claim 7, comprising:
considering the second cell to be another SpCell in response to receiving the MAC CE or in response to transmitting the RRC message.

10. The method of claim 1, wherein:
the one or more TCI states are for at least one of the PDCCH, a Physical Uplink Control Channel (PUCCH), a Physical Uplink Shared Channel (PUSCH) or a Physical Downlink Shared Channel (PDSCH).

11. A User Equipment (UE), comprising:
a control circuit;
a processor installed in the control circuit; and
a memory installed in the control circuit and operatively coupled to the processor, wherein the processor is configured to execute a program code stored in the memory to perform operations, the operations comprising:
receiving, from a first cell, a first signaling indicative of a configuration of a Physical Downlink Control Channel (PDCCH) of a second cell and a set of Transmission Configuration Indicator (TCI) states of the second cell;
receiving, from the first cell, a Medium Access Control (MAC) Control Element (CE) indicative of (i) switching a Special Cell (SpCell) of the UE to the second cell, (ii) one or more TCI states of the set of TCI states indicated by the first signaling and (iii) timing advance (TA) information associated with the second cell to which the MAC CE is indicative switching the SpCell of the UE; and
monitoring the PDCCH of the second cell, via the one or more TCI states indicated by the MAC CE and based on the configuration of the PDCCH indicated by the first signaling, in response to receiving the MAC CE indicative of switching the SpCell of the UE to the second cell.

12. The UE of claim 11, the operations comprising:
triggering or generating a Channel State Information (CSI) report for transmission to the second cell in response to receiving the MAC CE.

13. The UE of claim 11, wherein:
the first signaling is indicative of at least one of a cell configuration of the second cell, an identity associated with the second cell, an index associated with the second cell, a Cell Radio Network Temporary Identifier (C-RNTI) for the UE and for the second cell, one or more uplink resources associated with the second cell, or a Scheduling Request (SR) configuration associated with the second cell.

14. The UE of claim 13, the operations comprising:
triggering a SR associated with the SR configuration in response to receiving the MAC CE.

15. The UE of claim 11, wherein:
the MAC CE is indicative of at least one of an identity associated with the second cell, an index associated with the second cell, a Cell Radio Network Temporary Identifier (C-RNTI) for the UE and for the second cell, or one or more uplink resources associated with the second cell.

16. The UE of claim 11, the operations comprising:
activating the one or more TCI states in response to receiving the MAC CE.

17. The UE of claim 11, the operations comprising:
generating a Radio Resource Control (RRC) message for transmission to the second cell in response to receiving the MAC CE.

18. The UE of claim 17, the operations comprising:
transmitting the RRC message via one or more uplink resources indicated by at least one of the first signaling or the MAC CE.

19. The UE of claim 11, the operations comprising:
the one or more TCI states are for at least one of the PDCCH, a Physical Uplink Control Channel (PUCCH), a Physical Uplink Shared Channel (PUSCH) or a Physical Downlink Shared Channel (PDSCH).

20. A non-transitory computer-readable medium comprising processor-executable instructions that when executed by a User Equipment (UE) cause performance of operations, the operations comprising:
receiving, from a first cell, a first signaling indicative of a configuration of a Physical Downlink Control Channel (PDCCH) of a second cell and a set of Transmission Configuration Indicator (TCI) states of the second cell;
receiving, from the first cell, a Medium Access Control (MAC) Control Element (CE) indicative of (i) switching a Special Cell (SpCell) of the UE to the second cell, (ii) one or more TCI states of the set of TCI states indicated by the first signaling and (iii) timing advance (TA) information associated with the second cell to which the MAC CE is indicative switching the SpCell of the UE; and monitoring the PDCCH of the second cell, via the one or more TCI states indicated by the MAC CE and based on the configuration of the PDCCH indicated by the first signaling, in response to receiving the MAC CE indicative of switching the SpCell of the UE to the second cell.

\* \* \* \* \*